US007844548B2

(12) United States Patent
Robbin et al.

(10) Patent No.: US 7,844,548 B2
(45) Date of Patent: Nov. 30, 2010

(54) TECHNIQUES AND SYSTEMS FOR ELECTRONIC SUBMISSION OF MEDIA FOR NETWORK-BASED DISTRIBUTION

(75) Inventors: Gregory Robbin, Mountain View, CA (US); David Heller, San Jose, CA (US); Max Muller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 11/609,815

(22) Filed: Dec. 12, 2006

(65) Prior Publication Data

US 2007/0083471 A1 Apr. 12, 2007

Related U.S. Application Data

(63) Continuation-in-part of application No. 10/687,534, filed on Oct. 15, 2003, now abandoned.

(60) Provisional application No. 60/800,843, filed on May 15, 2006.

(51) Int. Cl.
*G06Q 99/00* (2006.01)

(52) U.S. Cl. ............................... 705/51; 705/1; 705/52; 705/67; 725/5

(58) Field of Classification Search ..................... 705/1, 705/52, 51
See application file for complete search history.

(56) References Cited

U.S. PATENT DOCUMENTS

| | | | | |
|---|---|---|---|---|
| 5,752,128 | A | 5/1998 | Yamashita | |
| 5,884,280 | A | 3/1999 | Yoshioka et al. | |
| 6,085,253 | A | 7/2000 | Blackwell et al. | |
| 6,226,618 | B1 | 5/2001 | Downs et al. | |
| 6,236,313 | B1 | 7/2001 | Milsted | |
| 6,263,313 | B1 | 7/2001 | Milsted et al. | |
| 6,338,044 | B1 | 1/2002 | Cook et al. | |
| 6,385,596 | B1 | 5/2002 | Wiser et al. | |
| 6,549,922 | B1 | 4/2003 | Srivastava et al. | |
| 6,691,149 | B1 | 2/2004 | Yokota et al. | |
| 6,731,312 | B2 | 5/2004 | Robbin | |
| 6,873,992 | B1 | 3/2005 | Thomas | |
| 6,874,003 | B2 | 3/2005 | Morohashi | |
| 6,910,049 | B2 | 6/2005 | Fenton et al. | |
| 7,073,193 | B2 | 7/2006 | Marsh | |
| 7,209,892 | B1 * | 4/2007 | Galuten et al. | 705/26 |
| 7,383,233 | B1 | 6/2008 | Singh et al. | |

(Continued)

FOREIGN PATENT DOCUMENTS

WO WO 00/08909 2/2000

(Continued)

OTHER PUBLICATIONS

"Liquifier Pro 4.0 for Windows™ User's Guide," 1998, Liquid Audio, Inc.

(Continued)

*Primary Examiner*—Vanel Frenel

(57) ABSTRACT

Methods and systems for submitting media to a media distribution site are disclosed. The submission of media to the media distribution site is able to be performed by numerous submitters in a uniform and computer-assisted manner. The submitted media can then be encoded in a largely automated manner at the media distribution site into a suitable digital form and then made available for online purchase and distribution.

36 Claims, 32 Drawing Sheets

U.S. PATENT DOCUMENTS

| | | | |
|---|---|---|---|
| 2001/0021926 A1 | 9/2001 | Schneck et al. | |
| 2001/0044786 A1* | 11/2001 | Ishibashi | 705/77 |
| 2002/0002541 A1 | 1/2002 | Williams | |
| 2002/0032658 A1 | 3/2002 | Oki et al. | |
| 2002/0049844 A1 | 4/2002 | Nishikawa | |
| 2002/0099661 A1 | 7/2002 | Kii et al. | |
| 2002/0099696 A1 | 7/2002 | Prince | |
| 2002/0099801 A1 | 7/2002 | Ishii | |
| 2002/0107803 A1 | 8/2002 | Lisanke et al. | |
| 2002/0112171 A1 | 8/2002 | Ginter et al. | |
| 2002/0116293 A1 | 8/2002 | Lao et al. | |
| 2002/0124182 A1 | 9/2002 | Bacso et al. | |
| 2002/0152267 A1 | 10/2002 | Lennon | |
| 2002/0152278 A1 | 10/2002 | Pontenzone et al. | |
| 2002/0165811 A1 | 11/2002 | Ishii et al. | |
| 2002/0186844 A1 | 12/2002 | Levy et al. | |
| 2002/0198843 A1 | 12/2002 | Wang et al. | |
| 2003/0005173 A1 | 1/2003 | Shah et al. | |
| 2003/0065717 A1 | 4/2003 | Saito et al. | |
| 2003/0074465 A1 | 4/2003 | Tang et al. | |
| 2003/0115144 A1 | 6/2003 | Stefik et al. | |
| 2003/0120593 A1 | 6/2003 | Bansal et al. | |
| 2003/0135424 A1 | 7/2003 | Davis et al. | |
| 2003/0149742 A1 | 8/2003 | Bollerud | |
| 2004/0012618 A1 | 1/2004 | Finney | |
| 2004/0015427 A1 | 1/2004 | Camelio | |
| 2004/0015445 A1 | 1/2004 | Heaven | |
| 2004/0059929 A1 | 3/2004 | Rodgers et al. | |
| 2004/0133605 A1 | 7/2004 | Chang et al. | |
| 2004/0153968 A1 | 8/2004 | Ching et al. | |
| 2004/0167858 A1 | 8/2004 | Erickson | |
| 2004/0205028 A1 | 10/2004 | Verosub et al. | |
| 2004/0215733 A1 | 10/2004 | Gondhalekar et al. | |
| 2004/0254883 A1 | 12/2004 | Kondrk et al. | |
| 2004/0254949 A1 | 12/2004 | Amirthalingam | |
| 2004/0267552 A1 | 12/2004 | Gilliam et al. | |
| 2004/0268451 A1 | 12/2004 | Robbin et al. | |
| 2005/0021478 A1 | 1/2005 | Gautier et al. | |
| 2005/0034164 A1 | 2/2005 | Sano et al. | |
| 2005/0038813 A1 | 2/2005 | Apparao et al. | |
| 2005/0050218 A1 | 3/2005 | Sheldon et al. | |
| 2005/0050345 A1 | 3/2005 | Dowdy et al. | |
| 2005/0182792 A1 | 8/2005 | Israel et al. | |
| 2005/0240529 A1 | 10/2005 | Thomas | |
| 2005/0267894 A1 | 12/2005 | Camahan | |
| 2006/0015489 A1 | 1/2006 | Probst et al. | |
| 2006/0041748 A1 | 2/2006 | Lockhart et al. | |
| 2006/0074754 A1 | 4/2006 | Toyohara et al. | |
| 2006/0161604 A1 | 7/2006 | Lobo | |
| 2007/0011156 A1 | 1/2007 | Maron | |
| 2007/0106522 A1 | 5/2007 | Collins | |
| 2007/0192352 A1 | 8/2007 | Levy | |
| 2007/0265969 A1 | 11/2007 | Horwat et al. | |
| 2007/0266028 A1 | 11/2007 | Muller et al. | |
| 2007/0266047 A1 | 11/2007 | Cortes et al. | |

FOREIGN PATENT DOCUMENTS

| | | |
|---|---|---|
| WO | WO 02/48920 | 6/2002 |

OTHER PUBLICATIONS

Radified Guide to Ripping & Encoding CD Audio, http://mp3.radified.com, downloaded Oct. 7, 2003, pp. 1-5.
"Music Collector Features," Collectorz.com music collector features, http://www.collectorz.com/music/features.php, downloaded Oct. 7, 2003, pp. 1-2.
"Gracenote CDDB," Gracenote, product webpage, http://www.gracenote.com/gn_products/cddb/html, downloaded Oct. 7, 2003, pp. 1-2.
"Gracenote MusicID," Gracenote, product webpage, http://www.gracenote.com/gn_products/music_id.html, downloaded Oct. 7, 2003, pp. 1-2.
"AVCataloger Overview," NC Software, Inc., http://www.avcataloger.com/Products.aspx, downloaded Oct. 6, 2003, pp. 1-4.
Jyri Huopaniemi, "Music Encoding and Transmission," CUIDAD meeting, ICMC '2000 Berlin, Aug. 28, 2000.
"Media Encoding FAQ," Loudeye Corp., http://www.loudeye.com/digitalmedia/solutions/mediaenchost/enclodingfaq.asp, downloaded Oct. 9, 2003, pp. 1-3.
"Media encoding datasheet," Loudeye Corp., http://www.loudeye.com/digitalmedia/solutions/mediaenchost/encloding.asp, downloaded Oct. 9, 2003, pp. 1-4.
"Media hosting datasheet," Loudeye Corp., http://www.loudeye.com/digitalmedia/solutions/mediaenchost/hosting.asp, downloaded Oct. 9, 2003, pp. 1-2.
"Preview and Convera Announce availability of Digital Media Commerce Platform for Secure Digital Audio Devices," Convera press release, Las Vegas, NV, Consumer Electronics Show, Jan. 8, 2001, pp. 1-3.
Sonopress Global Network User Manual, Client Tools, Upload Data/Graphics Files to Sonopress, Sonopress, data unknown.
MPEG-7 Multimedia Description Schemes XM (Version 2.0), ISO/IEC, Mar. 2000, pp. 1-138.
U.S. Appl. No. 11/786,031 entitled Media Package Formate for Submission to a Media Distribution System, filed Apr. 9, 2007.
U.S. Appl. No. 11/946,711 entitled "Resubmission of Media for Network-Based Distribution", filed Nov. 28, 2007.
U.S. Appl. No. 11/946,711 entitled "Resubmission of Media for Network-Based Distribution", filed Nov. 28, 2007.
Radified Guide to Ripping & Encoding CD Audio, http://mp3.radified.com, downloaded Oct. 7, 2003, pp. 1-5.
"Music Collector Features," Collectorz.com music collector features, http://www.collectorz.com/music/features.php, downloaded Oct. 7, 2003, pp. 1-2.
"Gracenote CDDB," Gracenote, product webpage, http://www.gracenote.com/gn_products/cddb.html, downloaded Oct. 7, 2003, pp. 1-2.
"Gracenote MusicID," Gracenote, product webpage, http://www.gracenote.com/gn_products/music_id.html, downloaded Oct. 7, 2003, pp. 1-2.
"AVCataloger Overview," NC Software, Inc. http://www.avcataloger.com/Products.aspx, downloaded Oct. 6, 2003, pp. 1-4.
Jyri Huopaniemi, "Music Encoding and Transmission," CUIDAD meeting, ICMC '2000 Berlin, Aug. 28, 2000.
"Media Encoding FAQ," Loudeye Corp., http://www.loudeye.com/digitalmedia/solutions/mediaenchost/encodingfaq.asp, downloaded Oct. 9, 2003, pp. 1-3.
"Media encoding datasheet," Loudeye Corp., http://www.loudeye.com/digitalmedia/solutions/mediaenchost/encoding.asp, downloaded Oct. 9, 2003, pp. 1-4.
"Media hosting datasheet," Loudeye Corp. http://www.loudeye.com/digitalmedia/solutions/mediaenchost/hosting.asp, downloaded Oct. 9, 2003, pp. 1-2.
"Preview and Convera Announce Availability of Digital Media Commerce Platform for Secure Digital Audio Devices," Convera Press release, Las Vegas, NV, Consumer Electronics Show, Jan. 8, 2001, pp. 1-3.
Sonopress Global Network User Manual, Client Tools, Upload Data/Graphics Files to Sonopress, Sonopress, date unknown.
Liquifier Pro 4.0 for Windows User's Guide, Liquid Audio, Inc., Nov. 20, 1998.

* cited by examiner

700

702, 704, 706, 708, 710

```
<?xml version="1.0" encoding="UTF-8"?>

<package>
     <major_version>1</major_version>
     <minor_version>1</minor_version>
     <tool_name>iTunes Producer</tool_name>
     <tool_version>1.0b1</tool_version>
     <provider>Label Name</provider>
     <album>
          <album_upc>000000000000</album_upc>
          <album_title>Playlist No. 1 Title</album_title>
          <album_release_date>2003-09-23</album_release_date>
          <album_original_release_year>2003</album_original_release_year>
          <album_label_name>Label Name</album_label_name>
          <album_genres>
               <genre>Rock</genre>
               <genre>Alternative</genre>
          </album_genres>
          <album_copyright_cline>2003 Label Name</album_copyright_cline>
          <album_copyright_pline>2003 Label Name</album_copyright_pline>
          <album_artwork_files>
               <file>
                    <file_name>Cover.jpg</file_name>
                    <checksum
type="md5">7934F59CD683D51A11FAC9A077CBECF9</checksum>
               </file>
          </album_artwork_files>
          <album_display_artist>Artist Name</album_display_artist>
          <album_products>
               <product>
                    <sales_start_date>2003-09-23</sales_start_date>
               </product>
          </album_products>
          <album_tracks>
               <track>
                    <track_isrc>CA1234567890</track_isrc>
                    <track_title>Track One Title</track_title>
                    <track_genres>
                         <genre>Rock</genre>
                         <genre>Alternative</genre>
                    </track_genres>
                    <track_volume_number>1</track_volume_number>
                    <track_volume_count>1</track_volume_count>
                    <track_track_number>1</track_track_number>
                    <track_track_count>8</track_track_count>
                    <track_audio_file>
                         <file_name>Track-One-Title.m4a</file_name>
                         <checksum
type="md5">83D9D2E9E941814C0C1991026EF7B9C7</checksum>
                    </track_audio_file>
```

FIG. 7

TECHNIQUES AND SYSTEMS FOR ELECTRONIC SUBMISSION OF MEDIA FOR NETWORK-BASED DISTRIBUTION

CROSS-REFERENCE TO RELATED APPLICATIONS

This application is a Continuation-In-Part of U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION", which is hereby incorporated herein by reference.

This application also claims priority from U.S. Provisional Patent Application No. 60/800,843, filed May 15, 2006, and entitled "TECHNIQUES AND SYSTEMS FOR ELECTRONIC SUBMISSION OF MEDIA CONTENT", which is hereby incorporated herein by reference.

BACKGROUND OF THE INVENTION

1. Field of the Invention

The present invention relates to electronic transmission of media and, more particularly, to electronic submission of media for purposes of media purchase and distribution.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years, music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

Today, various online media hosting sites permit virtual visitors to purchase and download albums or songs via the Internet (e.g., World Wide Web). However, in order for the albums or songs to be offered for purchase and download, the electronic content for the albums or songs must first be provided to the media hosting sites. Conventionally, a music label desirous of selling audio productions of their songs online would produce a tape or CD and then physically mail the tape or CD to a representative for the media hosting site. Typically, a submission would include not only the audio productions of songs but also text and images associated with the songs. The text provides descriptive information (e.g., metadata) for the songs and the images pertain to associated artwork (e.g., cover art). More recently, music labels have electronically transmitted the audio production of their songs to a representative of the media hosting site. Unfortunately, there are various different means and formats by which various music labels submit their audio productions of songs and associated data. This problem is exacerbated by the large number of small music labels that make submissions. As a result, representatives of the media hosting site that receive the submissions face substantial burdens and difficulties due to the wide range of variation with respect to the submissions.

Thus, there is a need for improved approaches to submit media to an online media hosting site.

SUMMARY OF THE INVENTION

Broadly speaking, the invention relates to an improved system and method for submitting media to a media distribution site. The submission of media to the media distribution site is able to be performed by numerous submitters in a uniform and computer-assisted manner. The submitted media can then be processed in a largely automated manner at the media distribution site and then made available for online purchase and distribution.

The invention can be implemented in numerous ways, including as a method, system, device, apparatus, graphical user interface, or computer readable medium. Several embodiments of the invention are discussed below.

As a graphical user interface for use in submitting a media collection to a media distribution site, one embodiment of the invention includes at least the acts of: a media collection information window for assisting a user in providing media collection information, the media collection information including information that is associated with a media collection, the media collection including a plurality of media items; and a media content information window for assisting a user in providing media content information for each of the media items in the media collection, the media content information including information that is associated with one of the media items in the media collection.

As an electronic media package for submitting a media collection to a media distribution site, one embodiment of the invention includes at least: an image file associated with the media collection, the media collection including a plurality of media items; a metadata file including metadata for the media collection and/or one or more of the media items within the media collection; and a plurality of media files, each of the media files pertaining to one of the media items within the media collection.

As a method for submitting a media collection to a media distribution site, one embodiment of the invention includes at least the acts of: obtaining information for the media collection; obtaining media content for a plurality of media items to be included in the media collection, the media content being obtained from one or more media sources; converting the media content for the plurality of media items into compressed media files; obtaining information for each of the plurality of media items; forming an electronic package of the media collection, the electronic package including at least the compressed media files, the information associated with the media collection, and the information associated with the plurality of media items; and electronically transmitting the electronic package to the media distribution site.

As a computer readable medium including at least computer program code for submitting a media collection to a media distribution site, one embodiment of the invention includes at least: computer program code for obtaining information for the media collection; computer program code for obtaining media content for a plurality of media items to be included in the media collection, the media content being obtained from one or more media sources; computer program code for converting the media content for the plurality of media items into compressed media files; computer program code for obtaining information for each of the plurality of media items; computer program code for forming an electronic package of the media collection, the electronic package including at least the compressed media files, the information associated with the media collection, and the information associated with the plurality of media items; and computer program code for electronically transmitting the electronic package to the media distribution site.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 7 is a screenshot of a representative text file in a markup language format according to one embodiment of the invention.

DETAILED DESCRIPTION OF THE INVENTION

The invention relates to an improved system and method for submitting media to a media distribution site. The submission of media to the media distribution site is able to be performed by numerous submitters in a uniform and computer-assisted manner. The submitted media can then be processed in a largely automated manner at the media distribution site and then made available for online purchase and distribution. The media distribution site can also be referred to as an online media hosting site.

The invention pertains to a method and system for controlled submission of media in a client-server environment. The controlled submission can use encryption and user accounts to restrict unauthorized access. The media can, for example, be audio, video, or image data.

Embodiments of various aspects of the invention are discussed below with reference to FIGS. 1-14. However, those skilled in the art will readily appreciate that the detailed description given herein with respect to these figures is for explanatory purposes as the invention extends beyond these limited embodiments.

Figure 1:
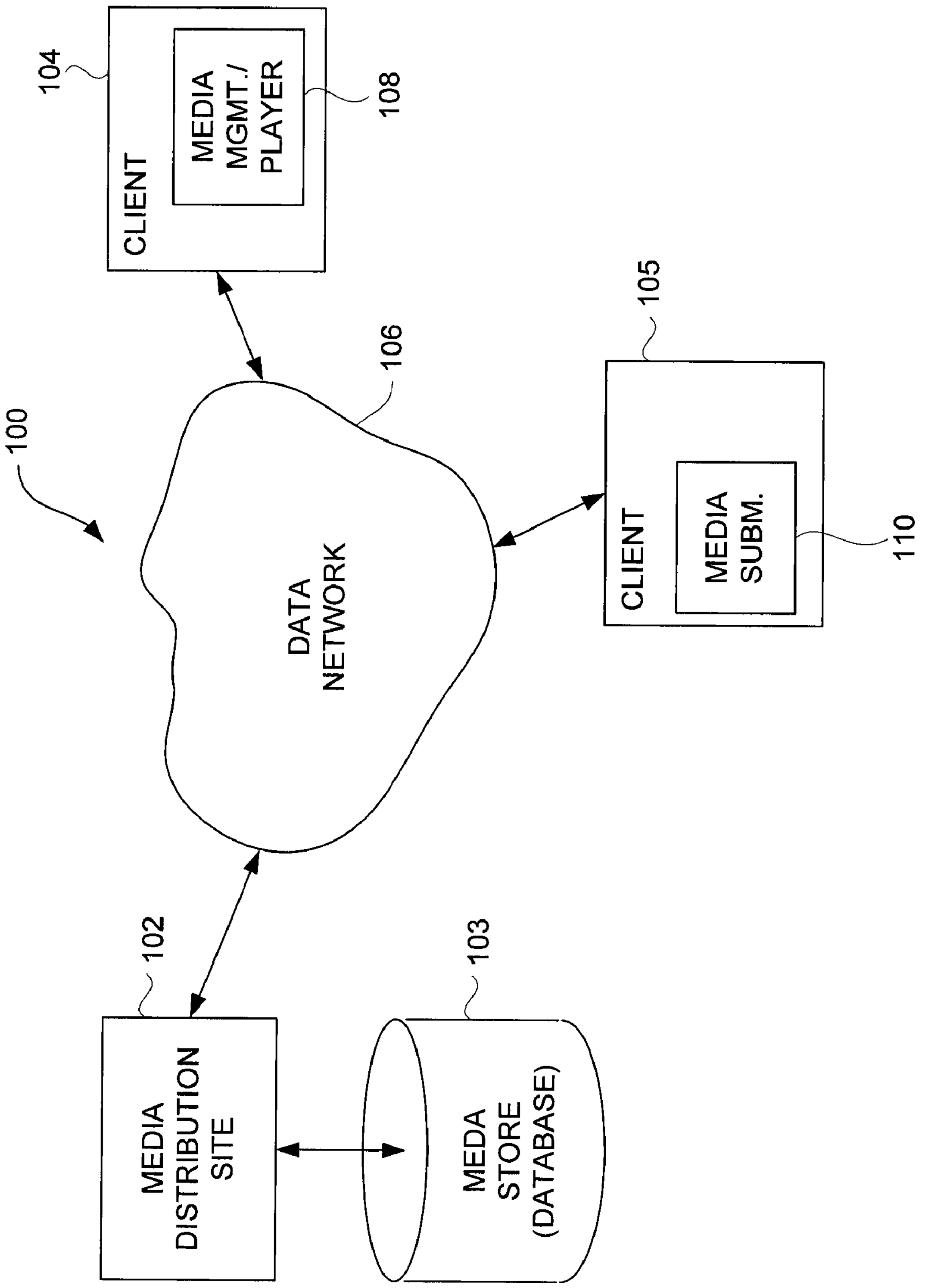
FIG. 1 is a block diagram of a media submission and distribution system 100 according to one embodiment of the invention.

FIG. 1 is a block diagram of a media submission and distribution system 100 according to one embodiment of the invention. The media submission and distribution system 100 includes a media distribution site 102. The media distribution site 102 coordinates submission (receipt), storage and purchase of media items. The media distribution site 102 stores media items in a media store 103. In one embodiment, the media store 103 is a database. The media store 103 provides mass storage of the numerous media items that are available for purchase. Once purchased, the media items can be accessed from the media store 103 over a data network 106 by way of the media distribution site 102.

The media submission and distribution system 100 also includes a first client 104 and a second client 105. Typically, the media submission and distribution system 100 would include a plurality of different clients 104, 105. The first client 104 includes a media management/player 108. The second client 105 includes a media submission program 110. Some clients can also include both the media management/player 108 and the media submission program 110. The media management/player 108 is an application program (e.g., software application) that operates on the first client 104, which is a computing device. One example of a suitable media management/player 108 is iTunes™ offered by Apple Computer, Inc. The first client 104 is coupled to the media distribution site 102 through the data network 106. Hence, any of the first clients 104 can interact with the media distribution site 102 to review, purchase and/or manage media items.

The media submission program 110 is also an application program (e.g., software application) that operates on the second client 105, which is a computing device. The media submission program 110 is used to submit media items to the media distribution site 102. Although the media management/player 108 and the media submission program 110 are shown in FIG. 1 as separate programs, it should be understood that such programs can be integrated into a single program or reside on the same second client.

In the media submission and distribution system 100 shown in FIG. 1, the media items are submitted to the media distribution site 102 by way of the media submission program 110. The media items that have been submitted (e.g., via the second client 105) are processed and then stored in the media store 103. Thereafter, the stored media items are available to be purchased from the media distribution site 102. Upon purchasing a particular media item, the media distribution site 102 permits the media content for the particular media item to be retrieved from the media store 103 and then delivered (e.g., downloaded) from the media distribution site 102 to the corresponding client 104 through the data network 106. In this regard, the media distribution site 102 obtains the media content corresponding to the particular media item from the media store 103 and downloads such content through the data network 106 to the client 104. The downloaded media content can then be stored on the client 104. In one embodiment, the downloaded media content is encrypted as received at the client 104 but is decrypted and then perhaps re-encrypted before persistent storage on the client 104. Thereafter, the media management/player 108 can present (e.g., play) the media content at the client 104.

The media submission and distribution system 100 allows a user of the client 104 to utilize the media player 108 to browse, search or sort through a plurality of media items that can be purchased from the media distribution site 102. The media management/player 108 may also allow the user to preview a media clip of the media items. In the event that the user of the media management/player 108 desires to purchase a particular media item, the user (via the media management/player 108) and the media distribution site 102 can engage in an online commerce transaction in which the user pays for access rights to the particular media item. In one embodiment, a credit card associated with the user is credited for the purchase amount of the particular media item.

The submission and purchase of the media items can be achieved over a data network 106. In other words, the submission and purchase of the media items can be achieved online. The purchase of media items online can also be referred to as electronic commerce (e-commerce). In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The connections through the data network 106 between the media distribution server 102 and the clients 104, 105 can be through secure connections, such as Secure Sockets Layer (SSL). Further, the media content can be re-encrypted prior to storage at the client 104 such that downloaded media content is not stored in the clear, but is instead stored in an encrypted manner.

Figure 2:
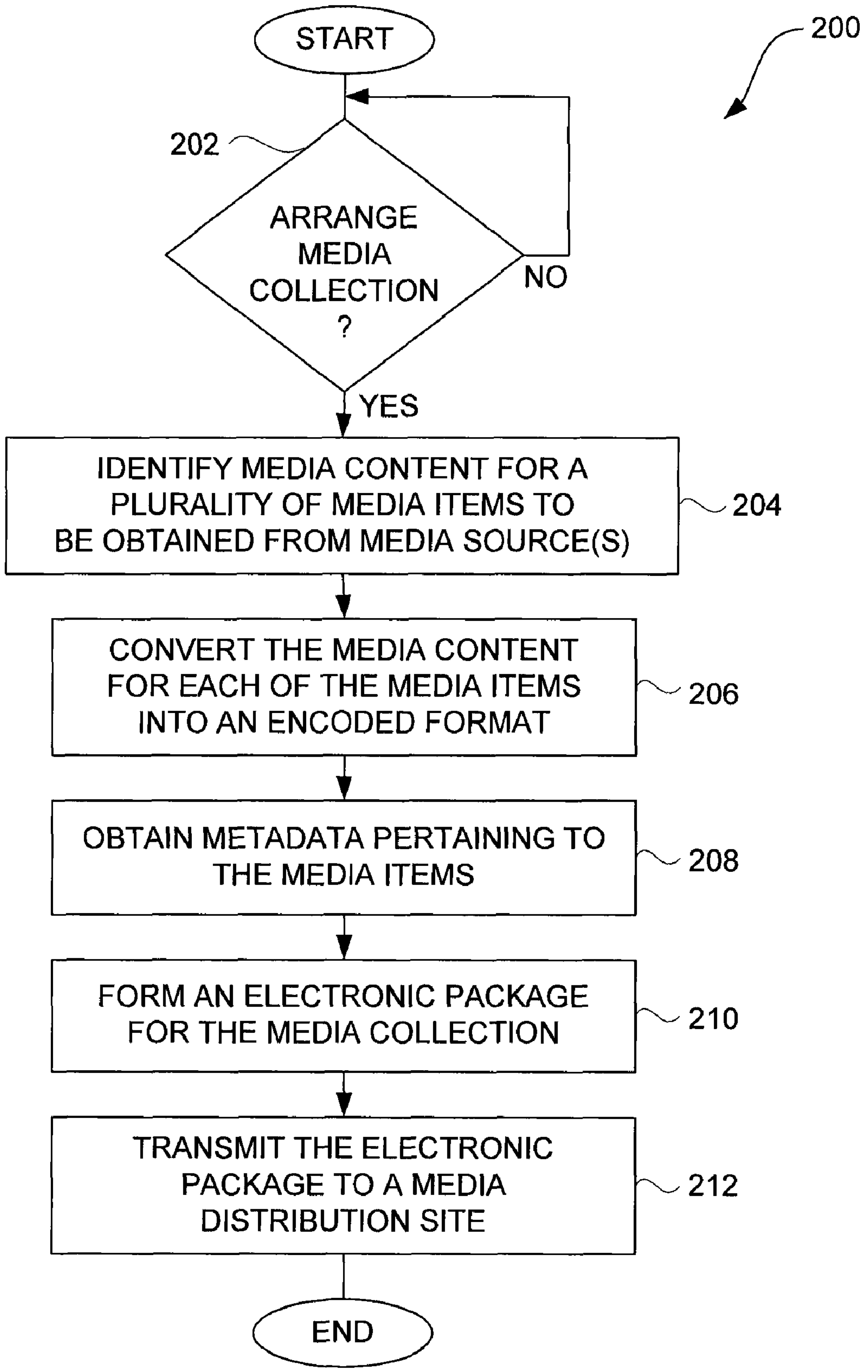
FIG. 2 is a flow diagram of a media submission process according to one embodiment of the invention.

FIG. 2 is a flow diagram of a media submission process 200 according to one embodiment of the invention. The media submission process 200 is typically performed by a client machine, such as the client 105 illustrated in FIG. 1. More particularly, the media submission program 110 at the client 105 illustrated in FIG. 1 can perform the media submission process 200.

The media submission process 200 begins with a decision 202 that determines whether a media collection is to be arranged for submission from a client machine to a server machine (e.g., media distribution site). When the decision 202 determines that a media collection is not to be arranged for submission at this time, then the media submission process 200 awaits a request to arrange a media collection. In other words, the media submission process 200 can be invoked whenever a request to arrange a media collection is received. Typically, a user of the client machine would interact with the client machine (e.g., the media submission program 110) to initiate a request to arrange a media collection.

In any case, once the decision 202 determines that a media collection is to be arranged, media content for a plurality of media items are identified. The identified media content for the media items is to be included within the media collection being arranged. Typically, the media content for these media items is retrieved from one or more media sources. Examples of media sources are compact discs (CDs) or media files. After the media content has been identified 204, the media content for each of the media items is converted 206 into an encoded format. Here, in the case of compact discs, the stored data is in a format that is not suitable for transmission over networks. Hence, typically, the format of the media content from compact disc is converted into an encoded format that is suitable for transmission through networks. Examples of encoded formats for audio files include Advanced Audio Coding (AAC), Apple Lossless, MPEG (e.g., MPEG4), MP3 and M4 files. In many cases, the encoding formats provide compression so that transmission is efficient. The compression can be lossy or lossless.

Next, metadata pertaining to the media items is obtained 208. In one embodiment, the metadata for the media items includes descriptive information regarding the media items. The metadata is, in one embodiment, provided by a user through interaction with the client machine (e.g., the media submission program 110).

Thereafter, an electronic package is formed 210 for the media collection. The electronic package is, for example, an electronic folder that includes a plurality of files. The plurality of files within the electronic folder include a file for the media content (in its compressed format) for each of the media items, folder metadata, and possibly other files. Here, the folder metadata can include not only the metadata for the media items, but also other metadata pertaining to the media collection and/or the organization of the electronic folder and components within the electronic folder. An example of one type of other file would be a file of an image that is to be associated with the media collection. The image, for example, can pertain to artwork to be utilized in association with the media collection. An example of another type of other file would be a file containing liner notes to be associated with the media collection. After the electronic package has been formed 210, the electronic package can be transmitted 212 to a media distribution site (e.g., server) for online purchase and distribution. The transmission 212 of the electronic package to the media distribution site concludes the media submission process 200.

Advantageously, the electronic packages being formed and transmitted to a media distribution site can have a standard format and arrangement. As a result, the media distribution site is able to process the incoming electronic packages in an automated manner.

Many users of the media submission process 200 can be affiliated with small recording labels or artists that desire to submit their media collections to media distribution sites so that such media collections can be offered for purchase at the media distribution sites. The standardization and uniformity provided by the media submission process 200 significantly reduces the burdens and difficulties otherwise placed on the media distribution sites.

Figure 3A:
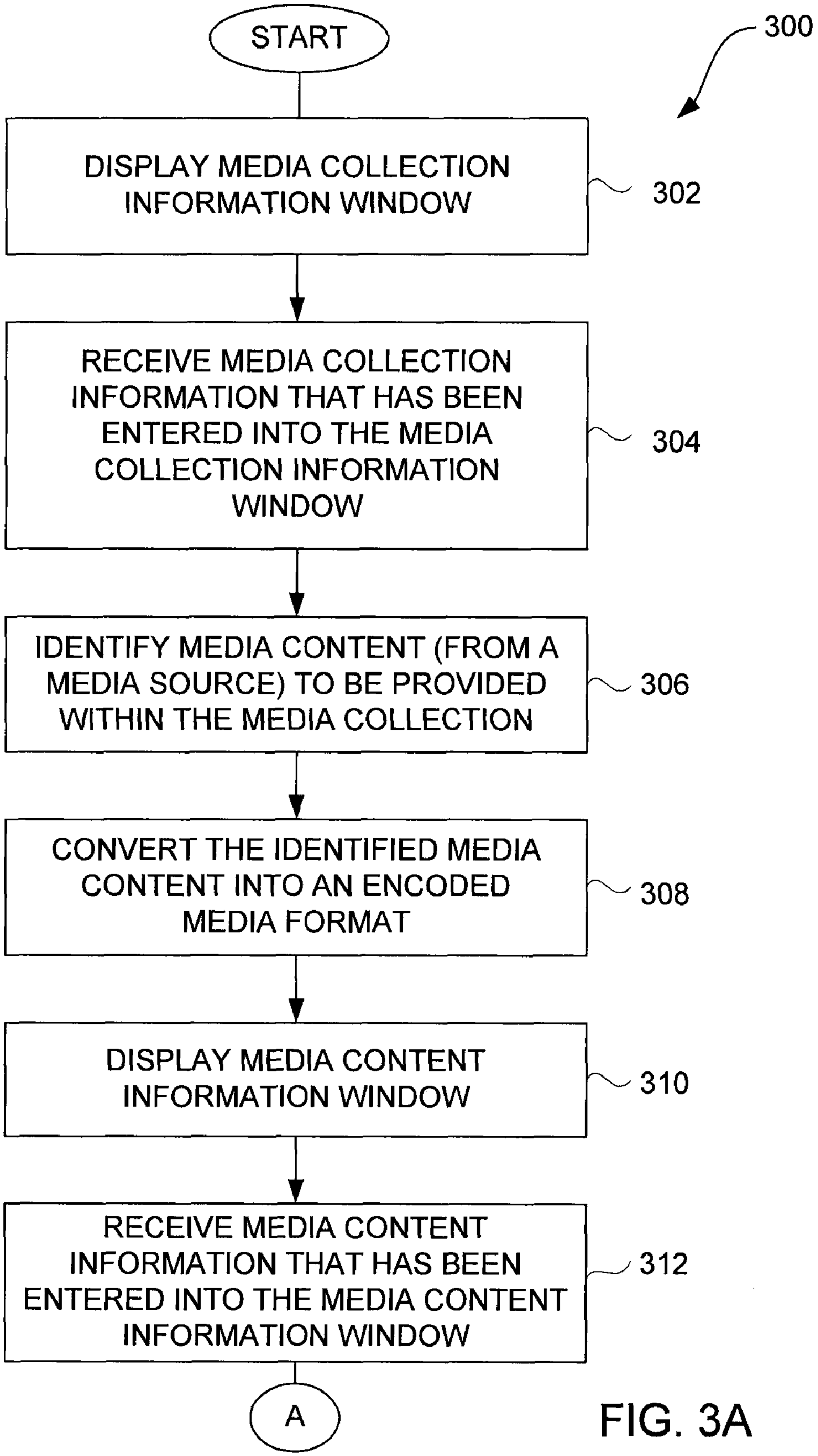
FIGS. 3A and 3B are flow diagrams of a media submission process according to another embodiment of the invention.
Figure 3B:
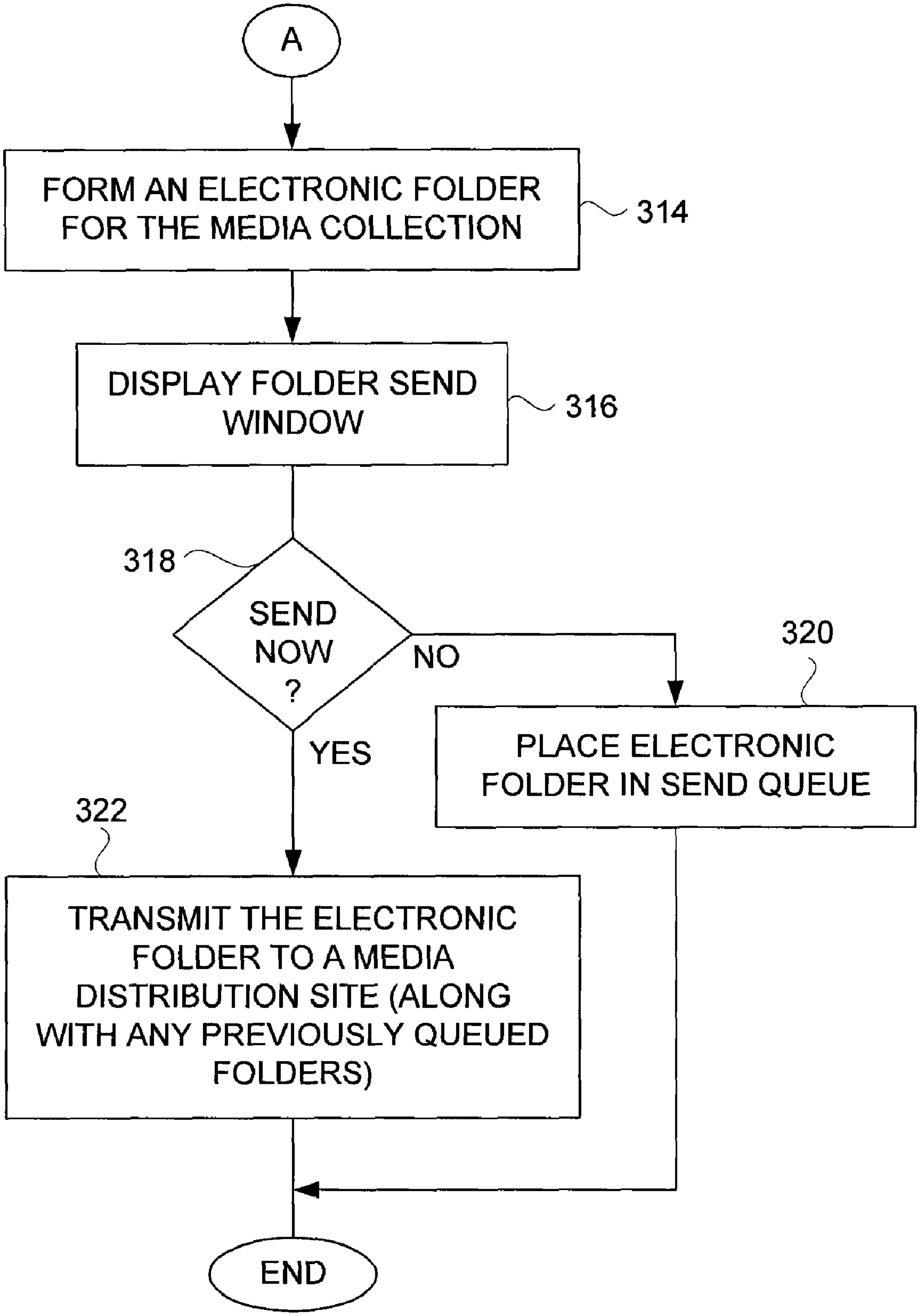

FIGS. 3A and 3B are flow diagrams of a media submission process 300 according to another embodiment of the invention. The media submission process 300 is typically performed by a client machine, such as the client 105 illustrated in FIG. 1. More particularly, the media submission program 110 at the client 105 illustrated in FIG. 1 can perform the media submission process 300.

The media submission process 300 initially displays 302 a media collection information window. Then, media collection information that has been entered into the media collection information window can be received 304. Here, the media submission process 300 receives 304 the media collection information that is entered into media collection information window by a user of the client machine (e.g., user of the media submission program 110). A representative media collection information window according to one embodiment of the invention is discussed below with reference to FIG. 4A.

Next, media content for media items to be provided within the media collection is identified 306. The media content being identified 306 represents that portion of the available media content from one or more media sources that is to be provided within the media collection. Examples of media sources are compact discs (CDs) or media files. In one implementation, to assist a user with the identification 306 of the media content for the media items, an import window can be displayed. The import window would assist the user with the identification of media items/media content to be included within the media collection. A representative import window according to one embodiment of the invention is discussed below with reference to FIG. 4B.

After the media content has been identified 306, the identified media content is converted 308 into an encoded media format. Here, the conversion 308 can be considered to encode the media content from a media source into a digital format suitable for electronic transmission and playing (such as MP3, M4, AAC, etc.). Encoding, in this context, refers to the process by which traditional forms of audio (e.g., compact disc) and video (e.g., VHS) are converted into a digital format that allows their distribution and broadcast over a network (e.g., the Internet).

Next, a media content information window is displayed 310. The media content information window assists the user to provide media content information regarding one or more of the media items. After the media content information window is displayed 310, media content information that has been entered into the media content information window is received 312. Here, the media submission process 300 receives 312 the media content information that is entered into media content information window by the user of the client machine (e.g., user of the media submission program 110). A representative media content information window according to one embodiment of the invention is discussed below with reference to FIG. 4C.

After the media content information that has been entered into the media content information window has been received 312, an electronic folder for the media collection is formed 314. The electronic folder includes a plurality of different files, typically some of which are different data types. For example, the media content for each media item within the media collection is provided as a digital media file (e.g., MPEG4 format), and the media collection information and the media content information are provided within a text file (e.g., markup language file, such as an XML file). The text file can also provide a description of the electronic folder that specifies the media and other files within the electronic folder as well as the media collection information and the media content information. If the text file identifies artwork for the media collection or the media items, then the text file specifies an image file (e.g., JPEG format) provided within the electronic folder that contains the artwork image.

Next, a folder send window is displayed 316. The folder send window assists the user in providing user indicia prior to submission of the media collection to the media distribution site. In one implementation, the user indicia is an account identifier and a password. A representative folder send window according to one embodiment of the invention is discussed below with reference to FIG. 5.

After the user indicia has been provided via the folder send window, a decision 318 determines whether the electronic folder is to be sent (i.e., submitted) at this time. Here, the user can decide whether the electronic folder should be submitted at this time. For example, the user can choose whether the electronic folder should be submitted at this time using the folder send window.

When the decision 318 determines that the electronic folder should not be submitted at this time, then the electronic folder is placed 320 in a send queue. Once placed in the send queue, the electronic folder is stored at the client machine until such time as the electronic folder is eventually sent. On the other hand, when the decision 318 determines that the electronic folder should be sent, then the electronic folder is transmitted 322 to the media distribution site. Additionally, if other media collections were earlier queued by the media submission process 300, then any previously queued folders could also be sent to the media distribution site. Following the blocks 320 or 322, the media submission process 300 is complete and ends.

Figure 4A:
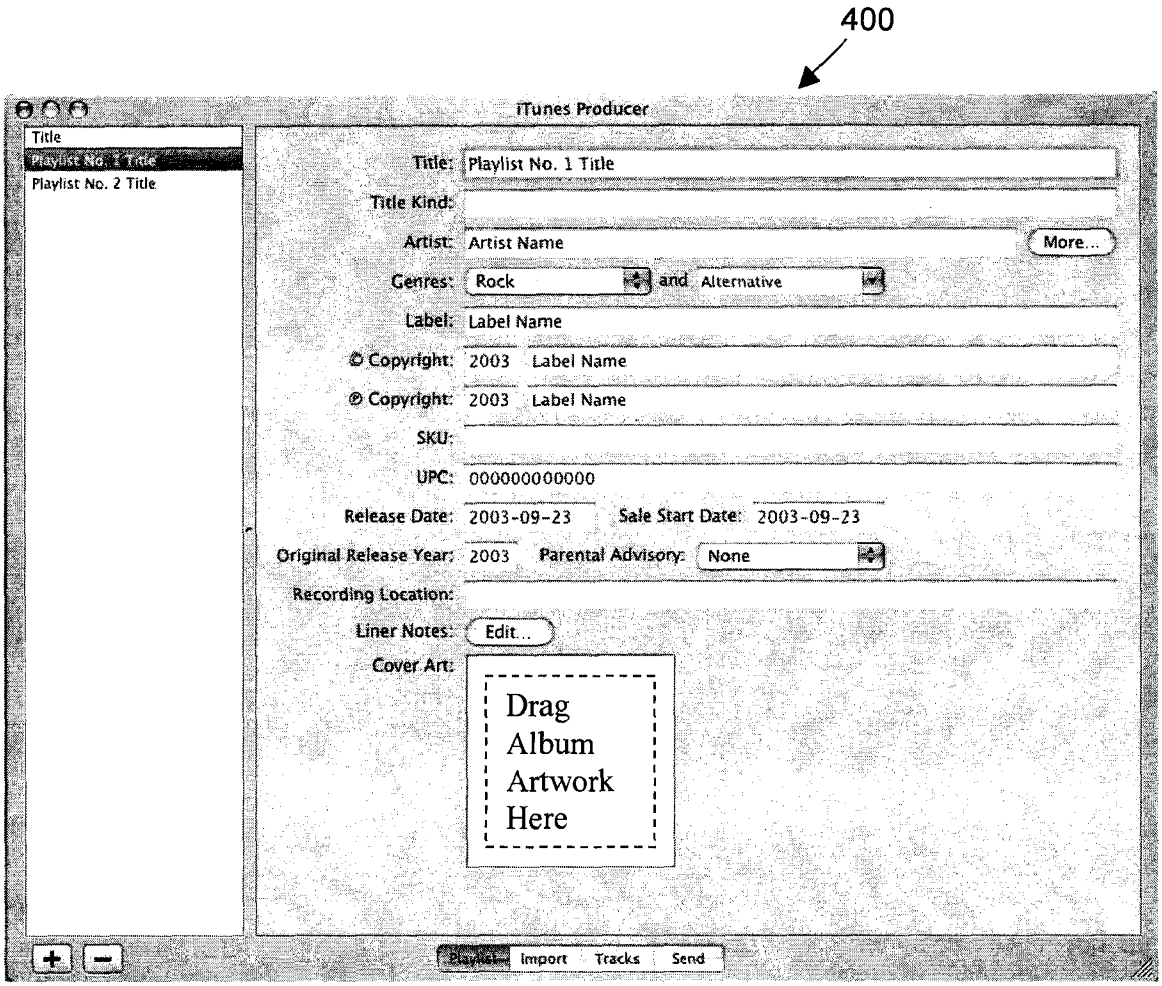
FIG. 4A is a screenshot of a representative media collection information window according to one embodiment of the invention.

FIG. 4A is a screenshot of a representative media collection information window 400 according to one embodiment of the invention. A user can interact with the media collection information window 400 to enter the media collection information. Using the media collection information window 400, media collection information, such as title, title kind (e.g., live, remix, etc.), artist, genre, label (i.e., music label), copyright, SKU, UPC, release date, sale start date, original release year, parental advisory, recording location, liner notes, and cover art, can be provided. As shown in FIG. 4A, the media collection information window 400 has several fields completed which contain media collection information.

Figure 4B:
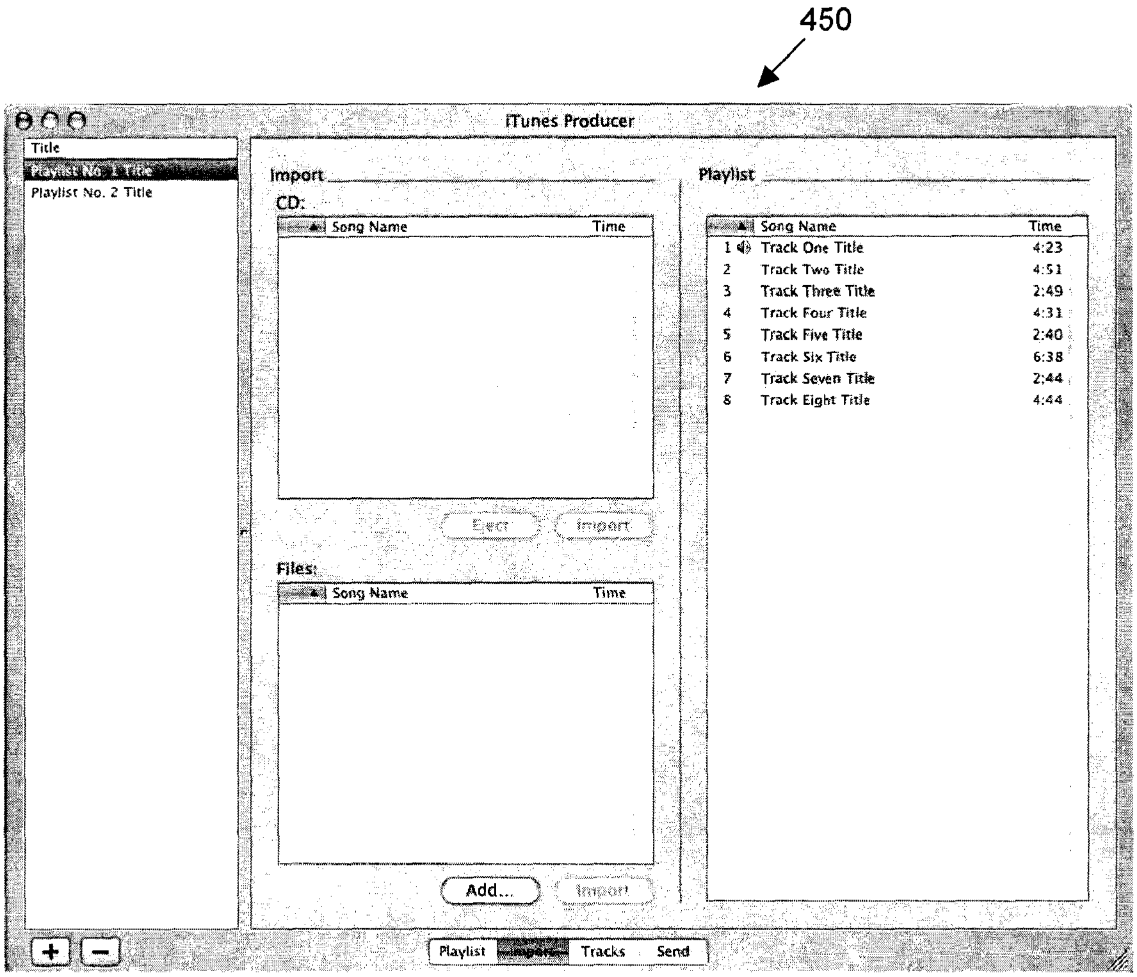
FIG. 4B is a screenshot of a representative import window according to one embodiment of the invention.

FIG. 4B is a screenshot of a representative import window 450 according to one embodiment of the invention. The import window assists a user with importing media items from media sources. Here, for the media collection "Playlist No. 1 Title", eight (8) media items (i.e., tracks) have been designated for import from import sources denoted "CD" or "Files." The media collection is referred to as a playlist.

Figure 4C:
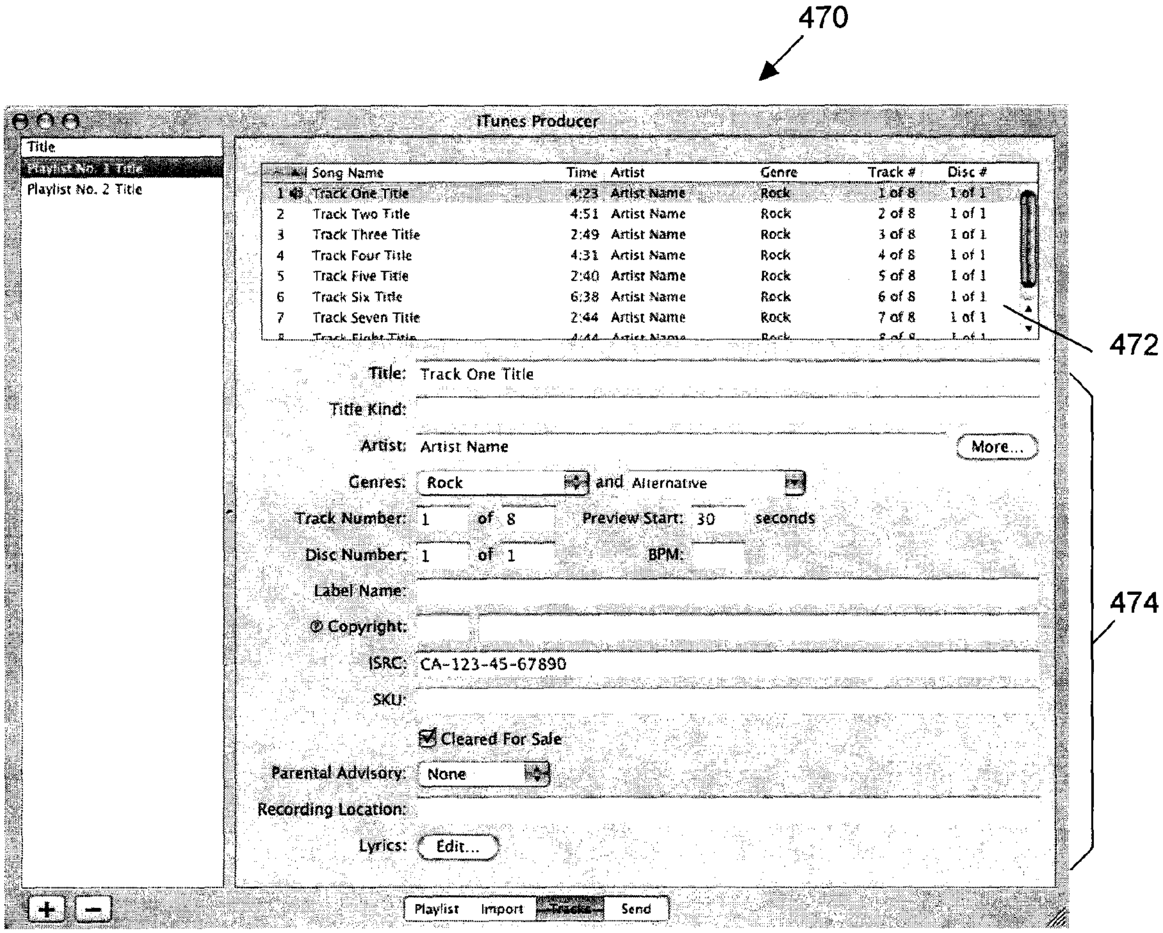
FIG. 4C is a screenshot of a representative media content information window according to one embodiment of the invention.

FIG. 4C is a screenshot of a representative media content information window 470 according to one embodiment of the invention. The representative media content information window 470 displays the media items in an upper area 472 and provides a lower area 474 for a user to enter the media content information pertaining to specific ones of the media items. The media items (i.e., tracks) shown in the upper region 472 correspond to the media items that were imported (see FIG. 4B). Upon selecting one of the media items in the upper area, the media content information to be associated with such media item can then be entered in the lower area 474 which provides text entry fields. As shown in FIG. 4C, the media content information for a particular media item can include such information as: title, title kind, artist, genres, track number, preview start, disk number, BPM, label name, copyright, ISRC, SKU, availability for sale indicator, parental advisory, recording location, and lyrics.

Figure 5:
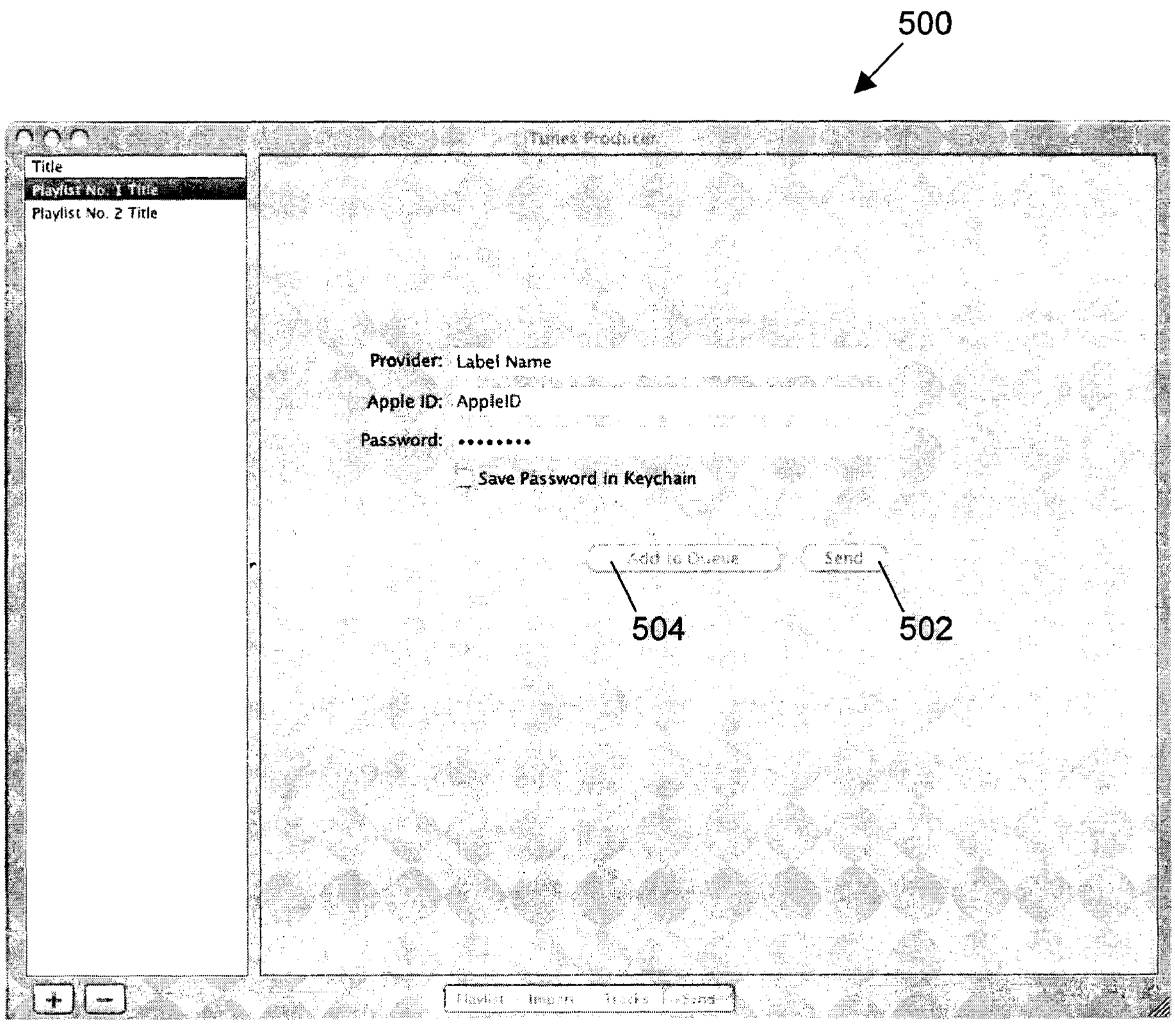
FIG. 5 is a screenshot of a representative folder send window according to one embodiment of the invention.

FIG. 5 is a screenshot of a representative folder send window 500 according to one embodiment of the invention. The folder send window 500 allows the user to identify the provider of the media collection (such as the name or producer of the music label), the account identifier associated with the provider (user), and a password. Additionally, the folder send window 500 enables the user to either submit the media collection (e.g., playlist) that has been assembled to the media distribution site 102 by a "Send" button 502, or to defer submission by an "Add to Queue" button 504.

Figure 6:
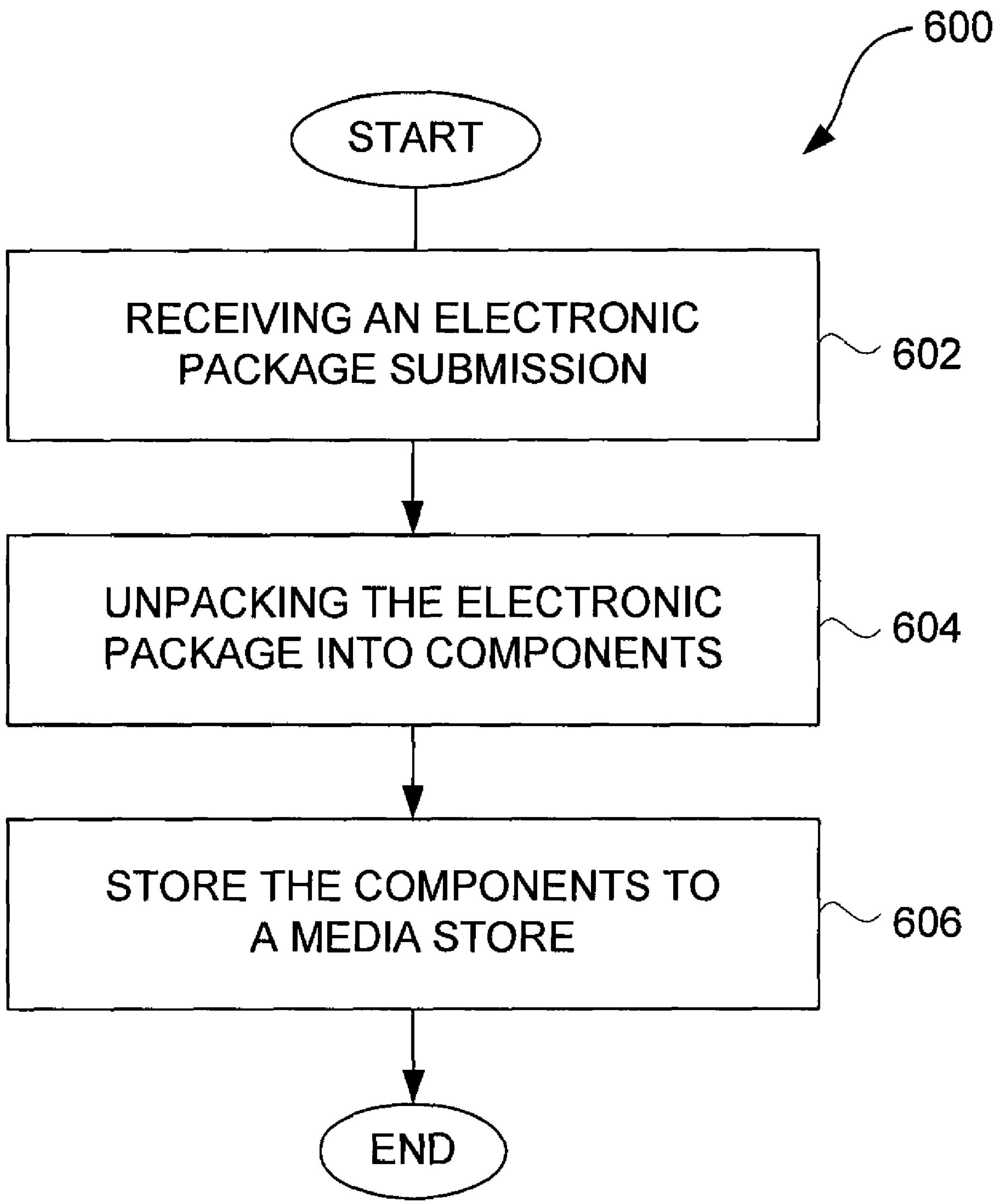
FIG. 6 is a flow diagram of a media reception process according to one embodiment of the invention.

FIG. 6 is a flow diagram of a media reception process 600 according to one embodiment of the invention. The media reception process 600 is typically performed by a server machine, namely, a media distribution site, such as the media distribution site 102 illustrated in FIG. 1.

The media reception process 600 initially receives 602 an electronic package submission. As previously noted, the electronic package submission would be received 602 at a media distribution site (e.g., the media distribution site 102). Then, the electronic package (e.g., electronic folder) is unpacked 604 into its various components. The unpacking 604 can involve obtaining the various media files and metadata from the electronic package. The metadata is typically provided within a text file. The text file can include organizational information as well as descriptive information for the media content. The organizational information can specify what components are provided within the electronic package. Hence, the unpacking 604 can include parsing of the text file to acquire not only the descriptive information but also the organizational information. In one embodiment, the text file is provided in a markup language (e.g., XML) and thus can be parsed using a markup language parser. Following the unpacking 604, the components of the electronic package can be stored 606 to a media store (e.g., media store 103). The media reception process 600 is then complete and ends. Following the media reception process 600, the media distribution site is able to render the media collection available for purchase online. For example, the media can be purchased online through a media distribution site (e.g., music site) that is accessible by client machines through the Internet.

FIG. 7 is a screenshot of a representative text file 700 in a markup language format according to one embodiment of the invention. In particular, the markup language format can, for example, be XML. The text file 700 has a header region 702, a media collection metadata region 704 with an artwork portion 706, a media item metadata region 708, and a media content region 710. The header region 702 identifies an electronic package, a tool used to produce the electronic package, and its provider. The media collection metadata region 704 contains playlist or album metadata. The artwork portion 706 indicates an image file and MD5 message digest that serves as a digital signature for the image file. The media item metadata region 708 provides metadata for each of the media items in the electronic package (e.g., track metadata). The media content region 710 indicates a media file (e.g., audio track file) and a MD5 message digest that serves as a digital signature for the media file.

FIGS. 8A-12B, discussed below, provide details, features or aspects of embodiments concerning submitting media to a media distribution site.

Figure 8A:
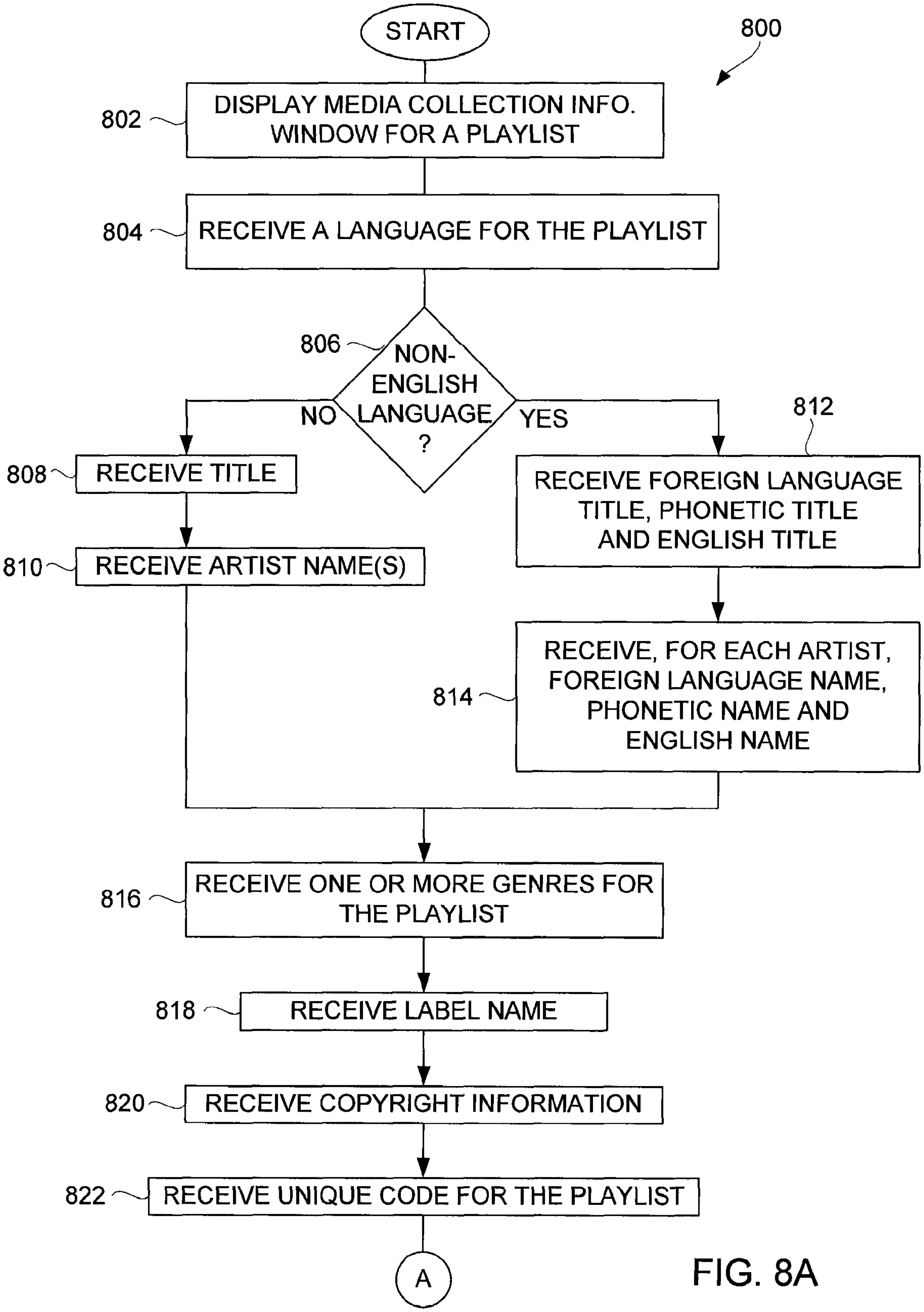
FIGS. 8A-8C are flow diagrams of a media collection information acquisition process according to one embodiment of the invention.
Figure 8B:
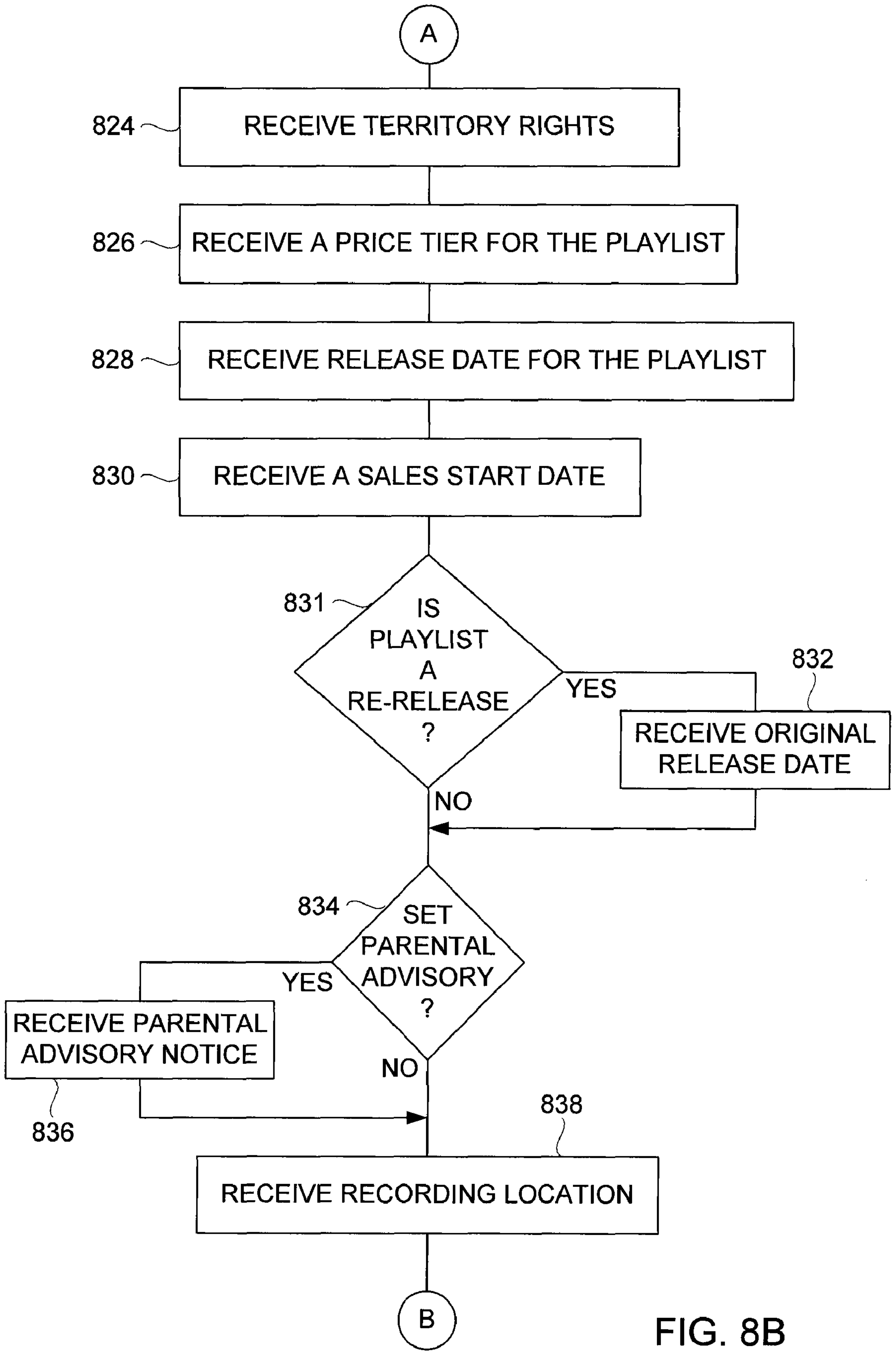
Figure 8C:
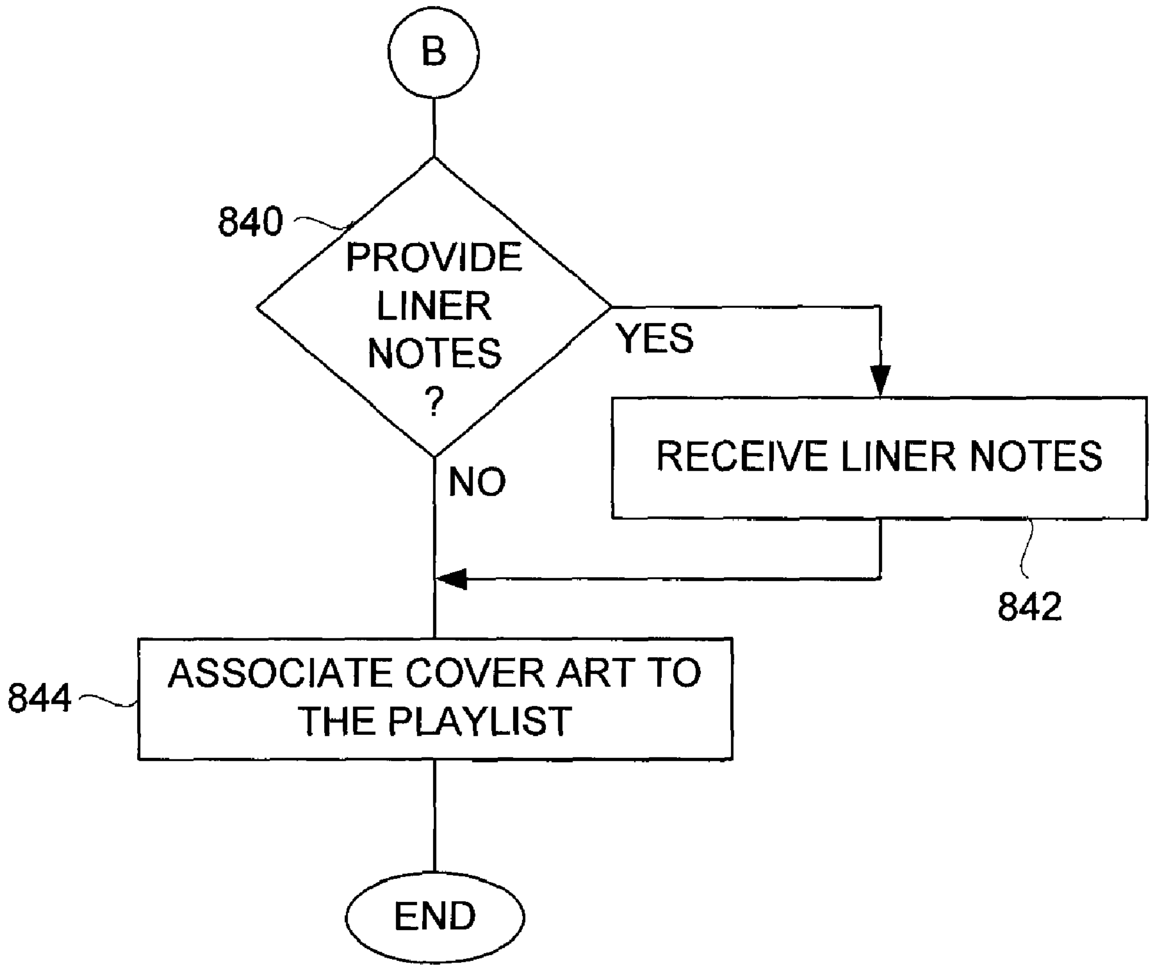

FIGS. 8A-8C are flow diagrams of a media collection information acquisition process 800 according to one embodiment of the invention. The media collection information acquisition process 800 is typically performed by a client machine, such as the client 105 illustrated in FIG. 1. More particularly, the media collection information acquisition process 800 can be performed by the media submission program 110 operating on the client 105 illustrated in FIG. 1.

Figure 9A:
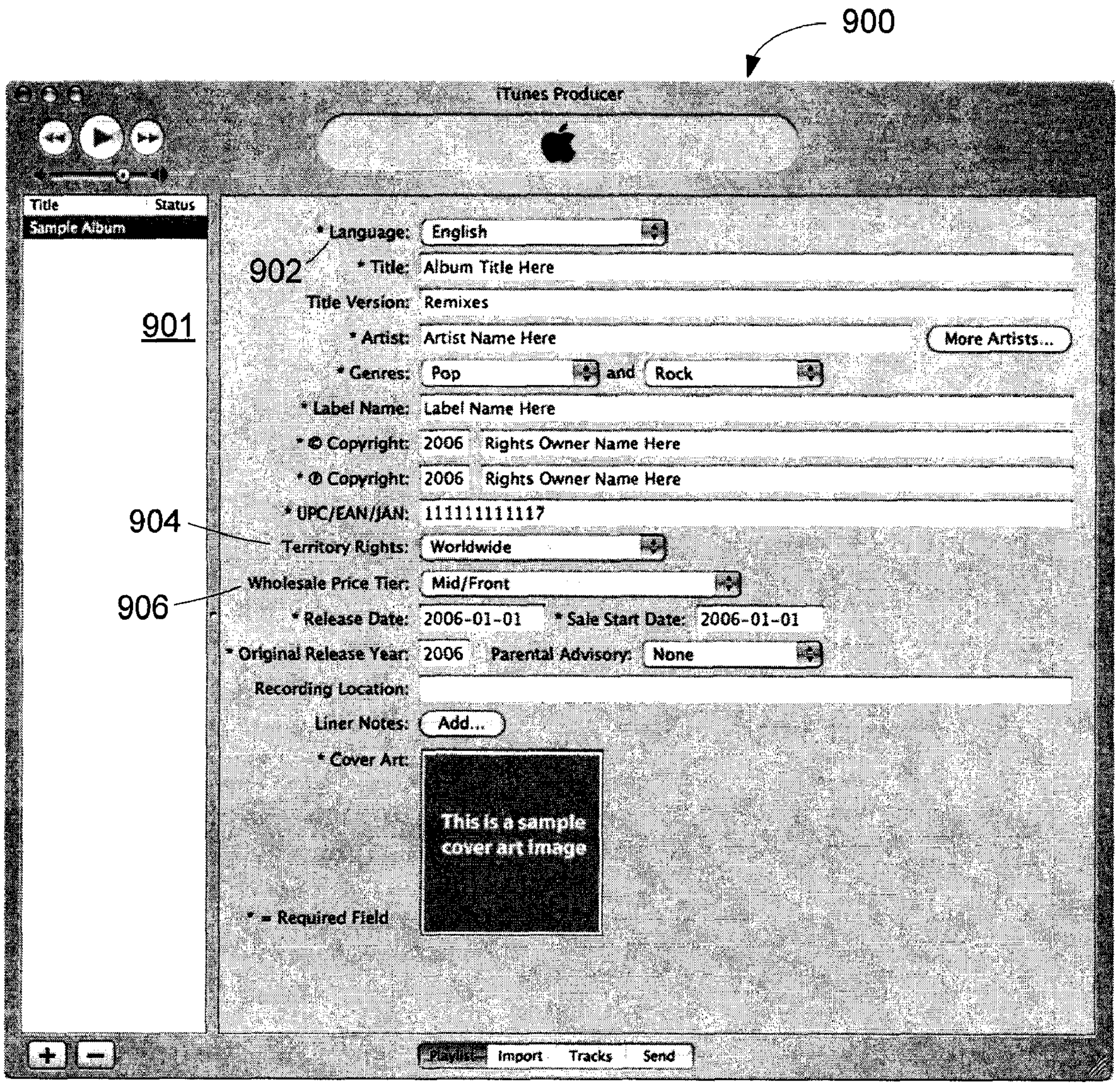
FIGS. 9A-9K are representative screen shots that can be produced by a media submission program.

The media collection information acquisition process 800 initially displays 802 a media collection information window for a playlist. A playlist is a collection of media items (i.e., media collection), such as an album, compilation or other media collection. FIG. 9A illustrates a representative media collection information window. The media collection information window is used to acquire media collection information.

Once the media collection information window is displayed 802, a language for the playlist being created can be received 804. Here, typically the user will designate a particular language to be utilized for the playlist. Next, a decision 806 determines whether the selected language is a non-English language. When the decision 806 determines that the selected language is the English language, then a title for the playlist is received 808. Further, one or more artist's names for the playlist are received 810. In this case, the title and the one or more artist names are received in English. On the other hand, when the decision 806 determines that the selected language is a non-English language, then a foreign language title, a phonetic title and an English title can be received 812 for the playlist. As an example, when the selected language is Japanese, a Japanese title, a phonetic title for the Japanese title, and an English title can be received 812 for the playlist. In addition, for each artist associated with the playlist, a foreign language name, a phonetic name and an English name can be received 814. As an example, when the selected language is Japanese, a Japanese name, a phonetic name for the Japanese name, and an English name can be received 812 for the one or more artists associated with the playlist. For some languages, the phonetic title and phonetic name may not be helpful and thus need not be utilized.

Following the block 810 or the block 814, one or more genres for the playlist can be received 816. As an example, the playlist can be associated with a primary genre as well as a secondary genre. These genres can be later utilized to categorize the playlist based on genres. For example, the playlist can be properly and automatically categorized at a media distribution site in view of the one or more genres that have been received.

A label name can also be received 818. For example, if the playlist pertains to music, the label name would designate the music label that is making the playlist available. Copyright information can also be received 820. The copyright information can pertain to the playlist and/or the sound recording for the playlist. Further, a unique code for the playlist can be received 822. As examples, the unique code can be a Universal Product Code (UPC), a European Article Number (EAN) or a Japanese Article Number (JAN).

Next, territory rights for the playlist are received 824. Territory rights are an indication of the territories, countries or regions where the playlist is permitted to be sold. Further, a price tier for the playlist is received 826. The price tier is a designation of a price tier for use when selling the playlist. In one embodiment, the price tier is not a price itself, but a designator for a pricing tier that is associated with a media distribution contract.

A release date for the playlist can also be received 828. The release date is the date on which the playlist was or will be released. A sale start date can also be received 830. The sale start date is a date on which the playlist will be made available for sale in all countries for which territory rights are available. However, in one embodiment, the sale start date can be set to different dates for different countries. A media distribution site can thus render the playlist unavailable until the appropriate sales start date whereby the playlist becomes available.

Next, a decision 830 determines whether the playlist is a pre-release. In other words, if the playlist was previously released, then the current playlist is a re-release. In this case, an original release date can be received 832. Following the block 832, or directly following the decision 830 when the playlist is not a pre-release, a decision 834 determines whether a parental advisory is to be set. In one embodiment, a parental advisory can default to no advisory ("none") setting. Hence, the decision 834 can determine whether the parental advisory is to be set to something other than the default setting. When the parental advisory is to be set, a parental advisory indication can be received 836. In one embodiment, the parental advisory indication being received 836 can be a selection of a "none", "explicit" or "clean" indication for the playlist. The "explicit" indicator can indicate that the playlist contains explicit content that may not be suitable for certain users. The "clean" designator can indicate that the playlist should be appropriate for all users. Hence, for a given playlist, the owner could offer the playlist in two separate formats, a clean format and an explicit format. Following the block 836, or directly following the decision 834 when a parental advisory is not to be set, a recording location can be received 838. The recording location is an indication of where the recording of the playlist was performed.

Next, a decision 840 determines whether liner notes are to be provided with the playlist. When the decision 840 determines that liner notes are to be provided, the liner notes are received 842. In one embodiment, the liner notes being received 842 can be identified by specifying an electronic file containing the liner notes. Following the block 842, or directly following the decision 840 when liner notes are not to be provided, cover art can be associated 844 to the playlist. In one embodiment, the cover art is an electronic image that is to be associated with the playlist. For example, in the case in which the playlist is an album of music, the cover art can be the artwork that would appear on the cover of the compact disc (CD) case for the album. As examples, the cover art can be associated with the playlist by specifying an electronic file containing the cover art or by a drag and drop operation with respect to the cover art. Following the block 844, the media collection information acquisition process 800 ends.

FIGS. 9A-9K are representative screen shots that can be produced by a media submission program. These representative screen shots are used to assist a user to provide information that pertains to a particular media collection being prepared for submission to a media distribution site. The media submission program can, for example, be the media submission program 110 illustrated in FIG. 1.

FIG. 9A is a screen shot of a representative media collection information window 900 according to one embodiment of the invention.

The media collection information window 900 includes a playlist region 901 that identifies a playlist ("Sample Album") to be processed. The playlist can be initially created by selecting an add ("+") button at the bottom of the media collection information window 900 and then providing the name ("Sample Album") for the playlist.

The media collection information window 900 allows a user to enter or select information that is to be associated with a media collection. The media collection can be referred to as a playlist. In one embodiment, the media collection information window 900 can be displayed 802 at a client device (e.g., client 105) by the media collection information acquisition process 800.

The media collection information window 900 includes text entry boxes, menus, lists or other user interface controls to assist a user in providing the information concerning the media collection. The media collection information that is acquired by way of the media collection information window 900 can include: a language, a title, a title version, one or more artists, one or more genres, a label name, copyright information, a unique identifier, territory rights 904, wholesale price tier 906, release date, sales start date, original release year, parental advisory, recording location, liner notes, and an image (e.g., cover art).

Figure 9B:
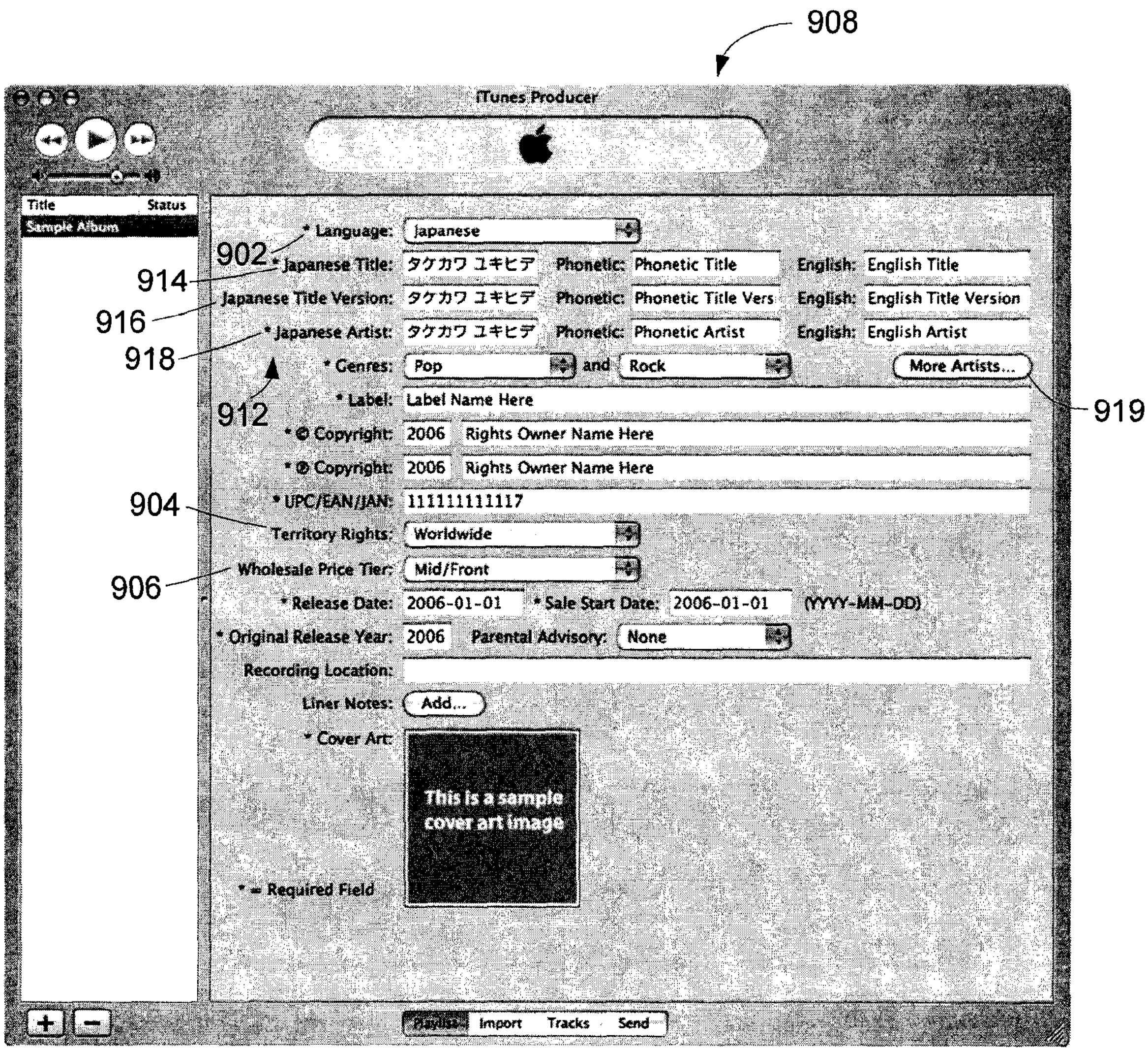

The language 902 pertains to the language of origin for the playlist. As examples, the language can be Danish, Dutch, English, Finnish, French, German, Greek, Italian, Japanese, Norwegian, Portuguese, Spanish or Swedish. For certain languages, the media collection information window 900 can be altered. For example, FIG. 9B illustrates a media collection information window 908 associated with a Japanese origin playlist. The media collection information window 908 is generally similar to the media collection information window 900 illustrated in FIG. 9A. However, the difference being that the media collection information window 908 includes an enhanced title and artist information acquisition region 912. In particular, title information 914, Japanese title version information 916, and Japanese artist information 918 can be acquired for the playlist. For the Japanese title information 914, a Japanese title, a phonetic title and an English title can be obtained. Similarly, for the Japanese title version information 916, a Japanese title version, a phonetic title version and an English title version can be acquired. For the Japanese artist information 918, a Japanese artist name, a phonetic artist name, and an English artist name can be acquired.

Figure 9C:
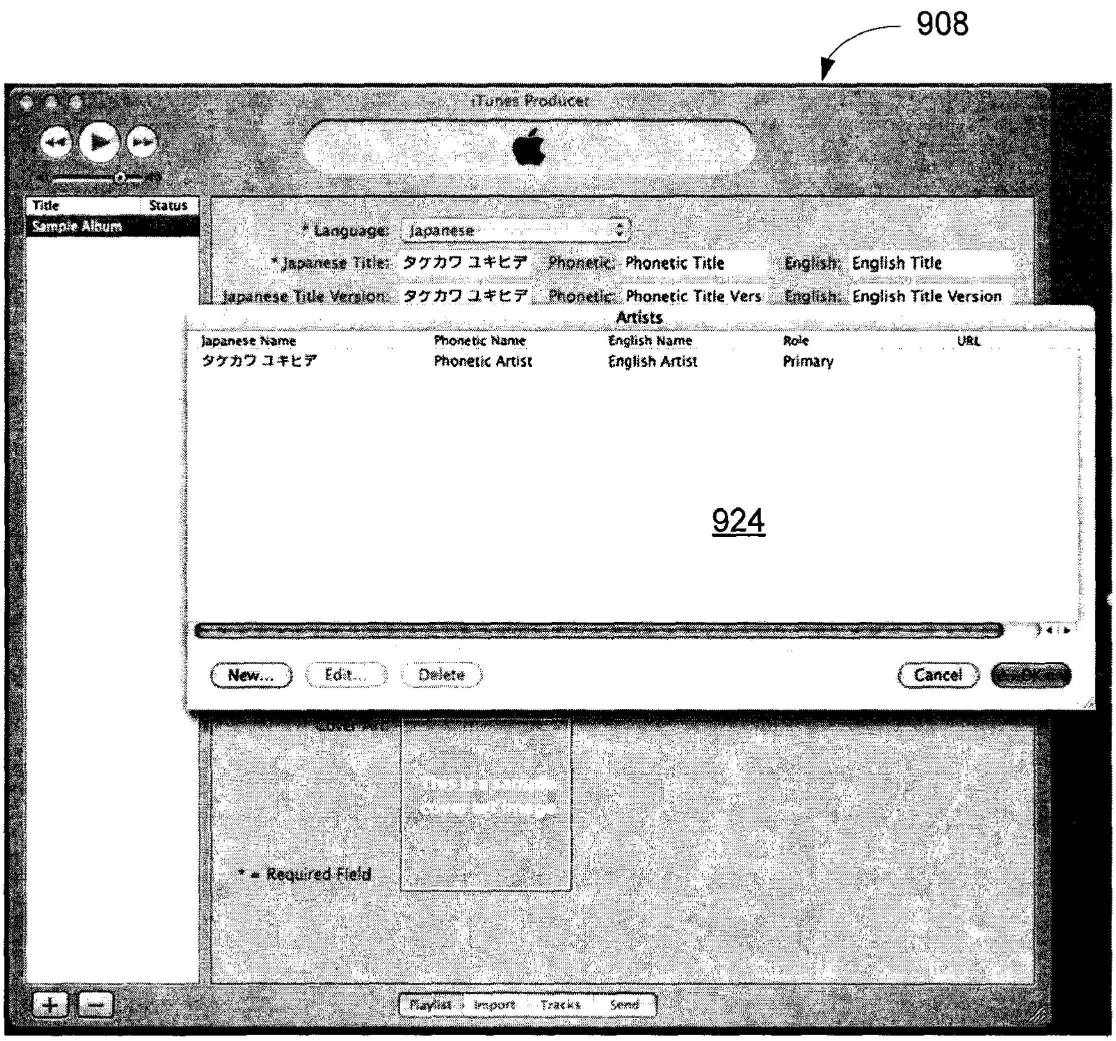
Figure 9D:
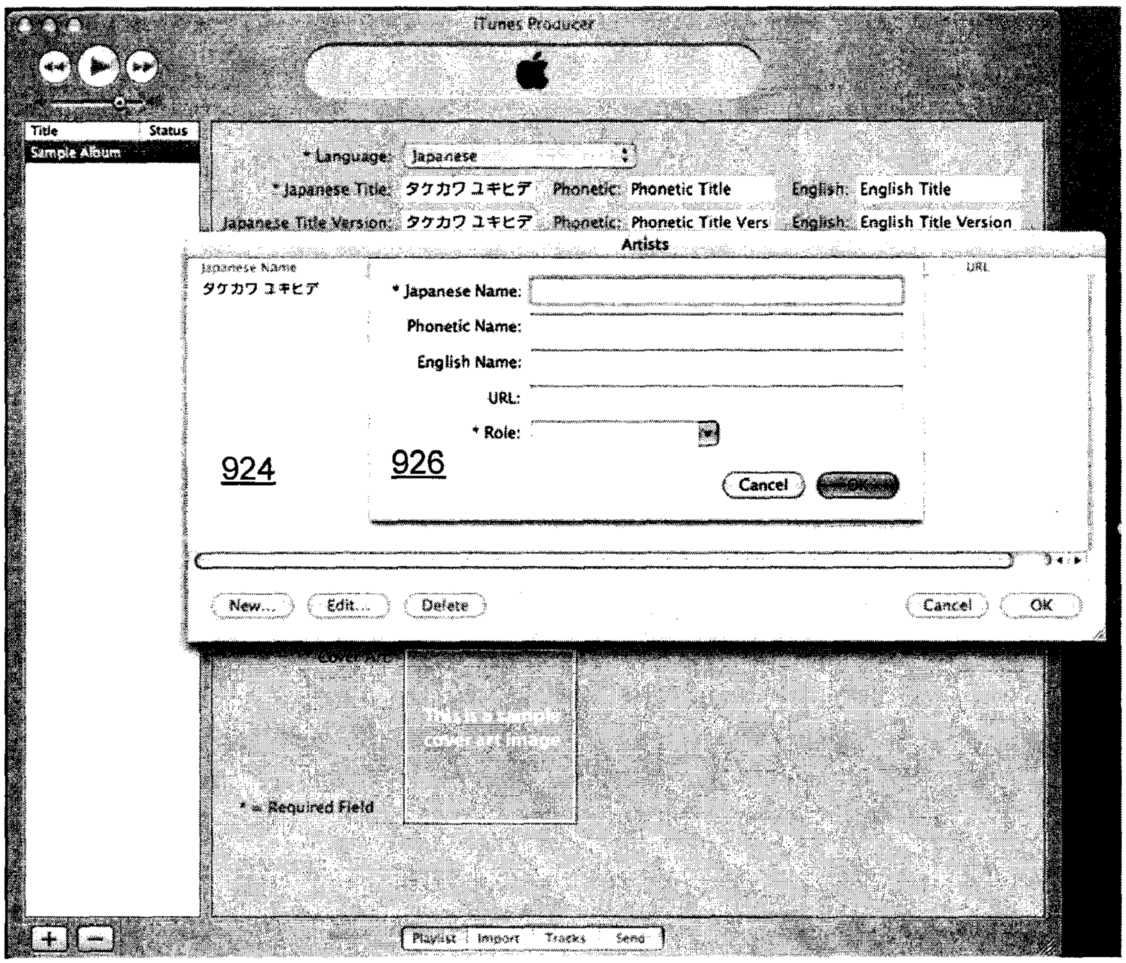
Figure 9E:
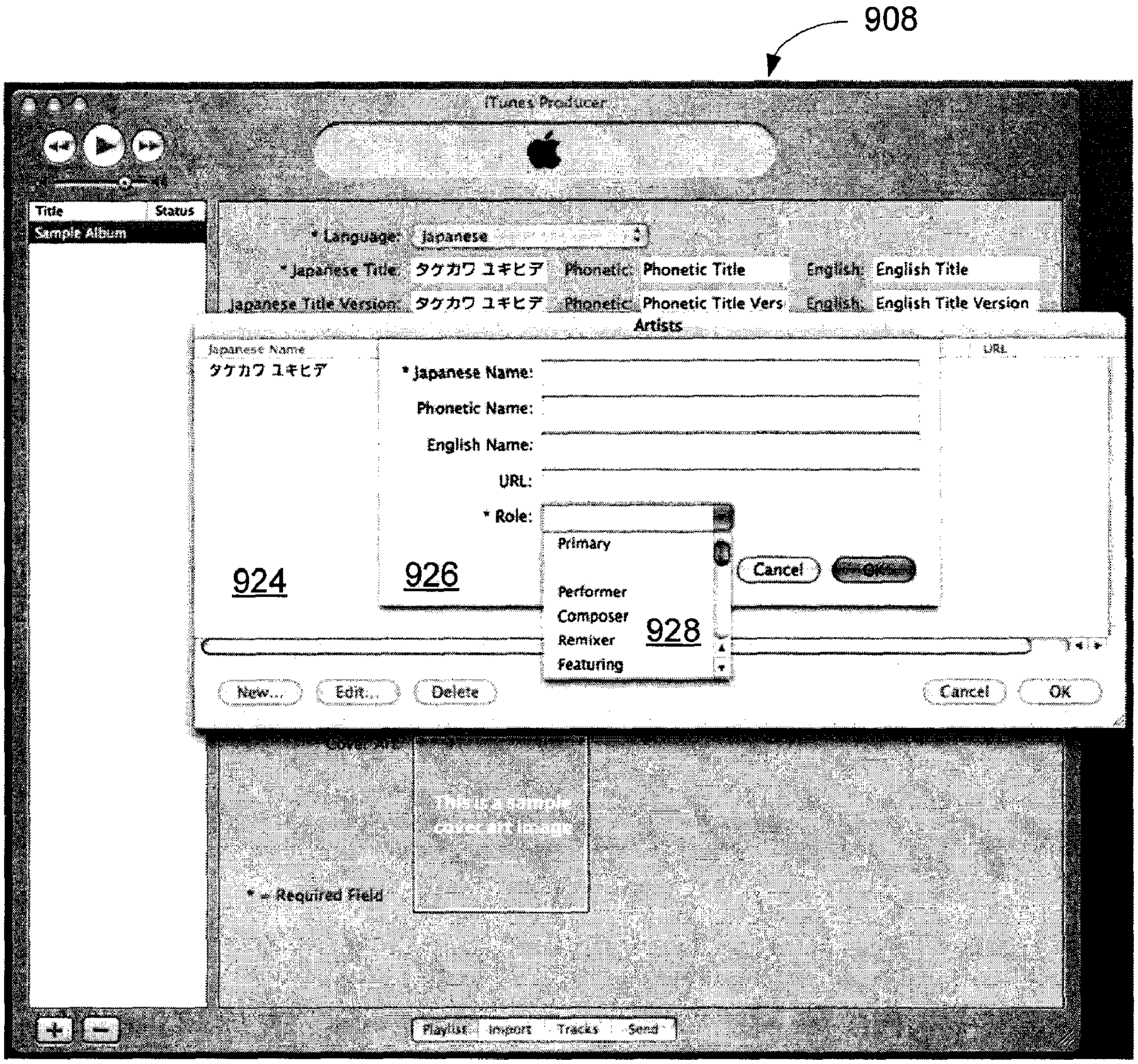

To provide information on additional artists, a button 919 can be selected. Once the button 919 is selected, an artist window 924 as shown in FIG. 9C can be displayed. Using the artist window 924, additional artists can be identified. For example, FIG. 9D illustrates an artist entry window 926 that can be displayed to add a new artist to the playlist. In this example, the playlist is a Japanese origin playlist so the artist window enables the user to specify a Japanese name, a phonetic name and an English name. In addition, the artist entry window 926 can also specify a link (e.g., URL) and a role. The role is the role of the artist with respect to the playlist. FIG. 9E illustrates a selectable list 928 of different roles that the artist may have provided. For example, the artist can be a primary artist, performer, composer, remixer, or featured.

Figure 9F:
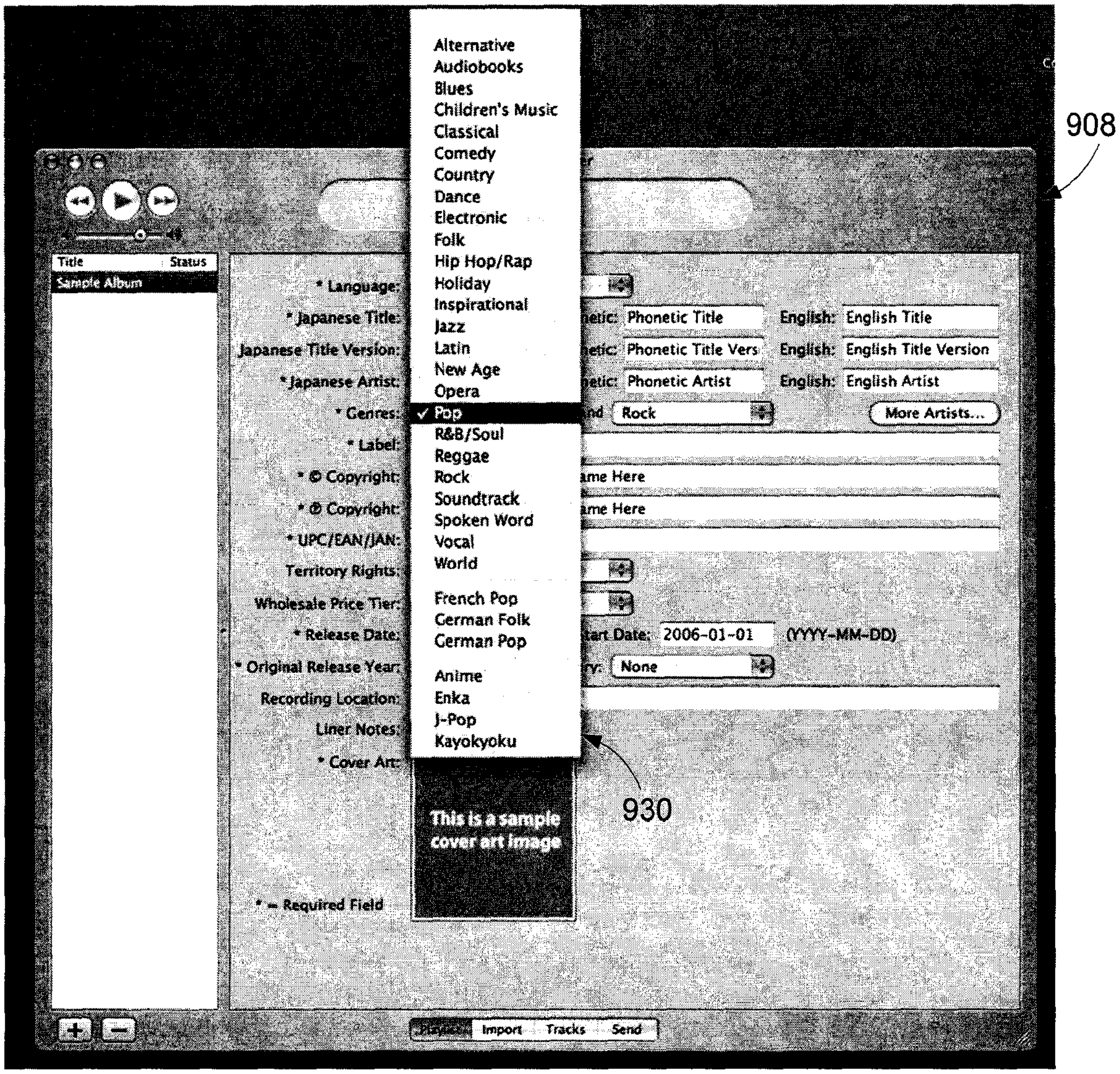

In selecting the one or more genres to be associated with the playlist, a pop-up list 930 as illustrated in FIG. 9F can be displayed to assist the user in selecting a genre. The various genres in the list 930 can be selected by the user. These one or more genres that have been selected can be utilized for later classification of the playlist which is useful for sales and distribution of the playlist at a media distribution site.

Figure 9G:
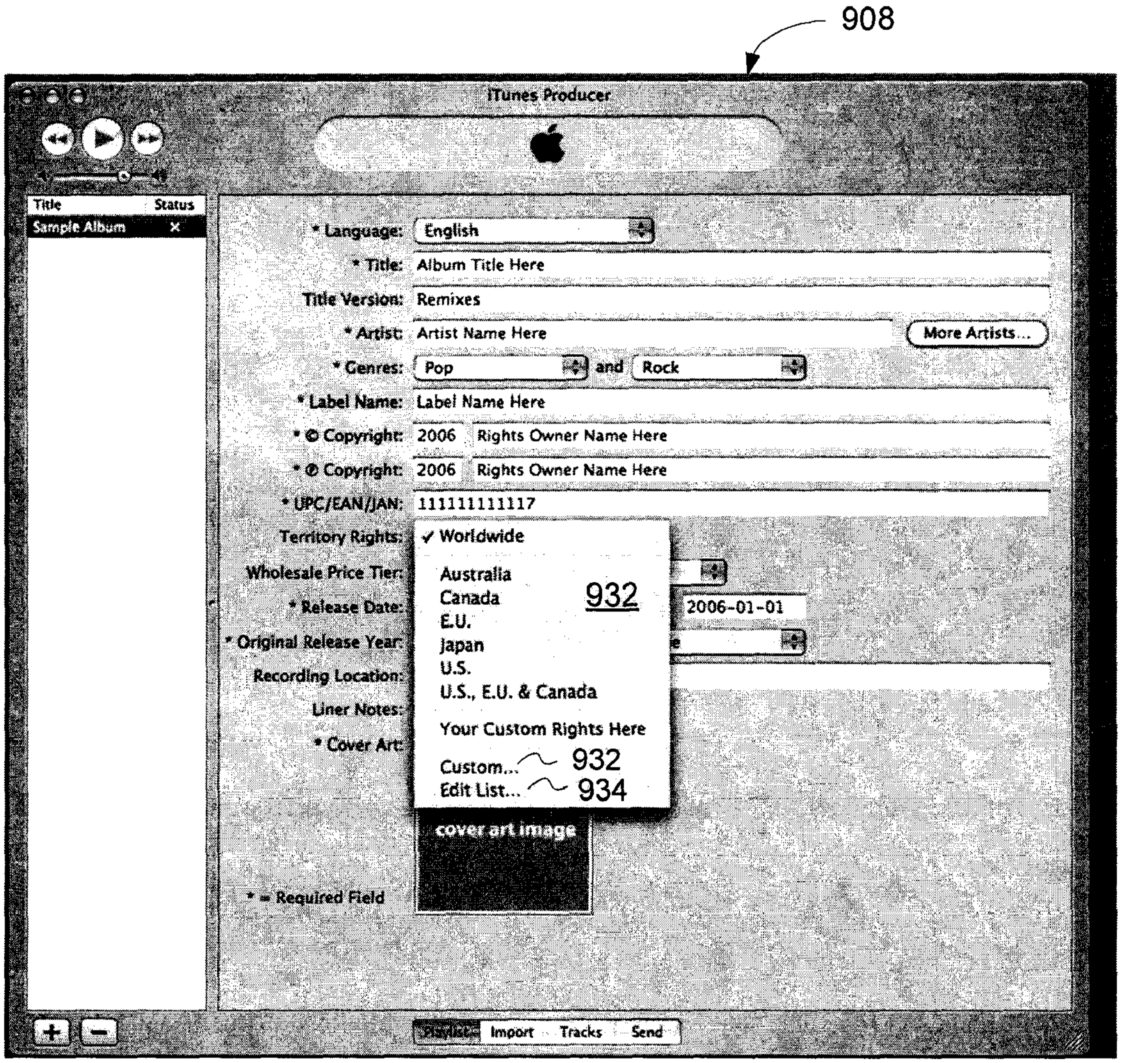

With respect to the territory rights 904, a user can select or otherwise identify one or more territories for which the playlist is authorized to be sold. The territories can be selected as a region or can be selected as individual countries. FIG. 9G illustrates a pop-up list 932 that can be utilized to assist a user in selecting the appropriate territory. The pop-up list 932 includes various territorial choices for selection, including: (1) Worldwide, (2) Australia, (3) Canada, (4) E.U., (5) Japan, (6) U.S., and (7) US, EU and Canada. The territorial choices in the pop-up list 932 are typical countries or regions for which territory rights are often authorized for sale of a media collection to users from territories via a media distribution site.

Figure 9H:
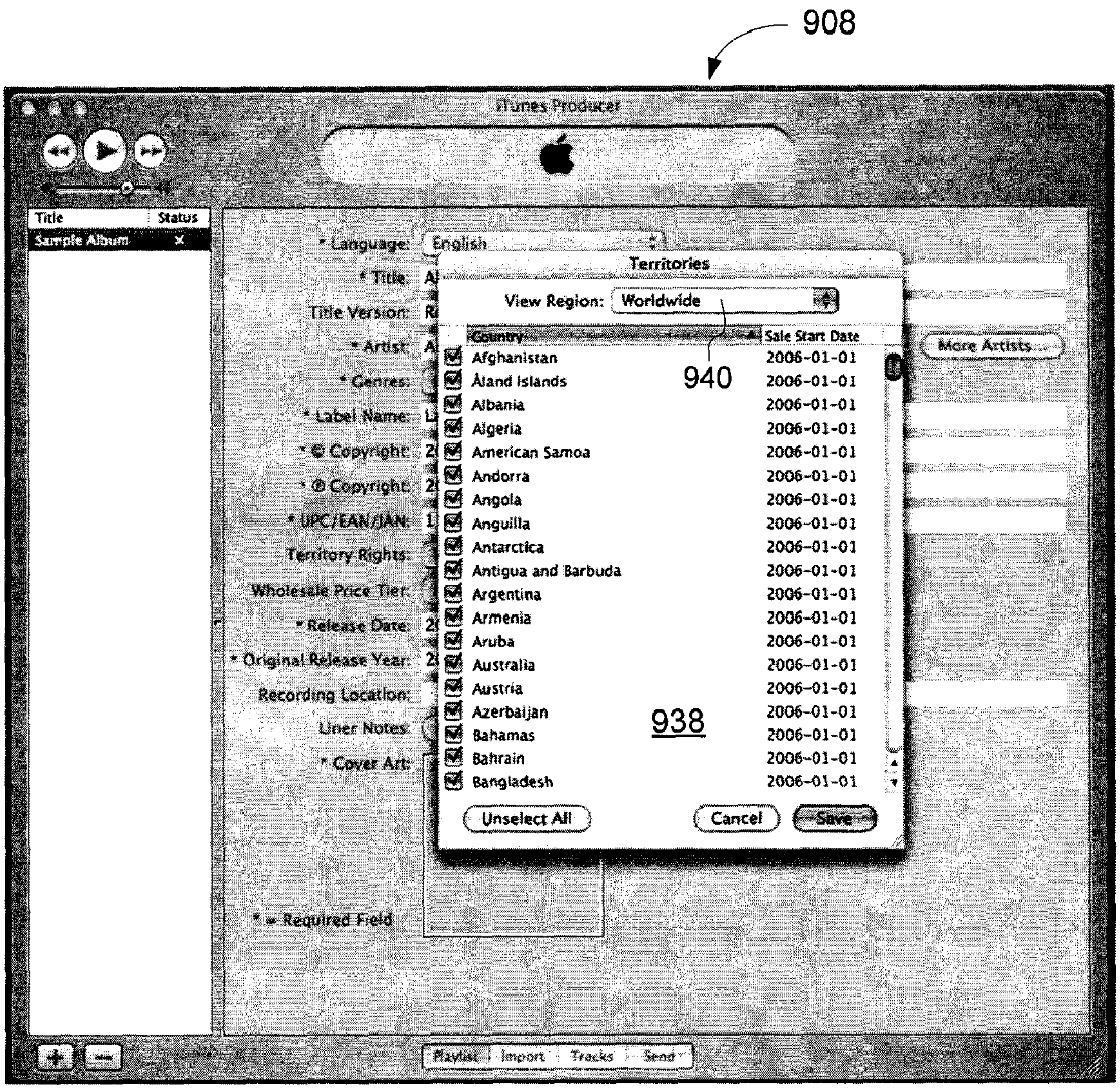
Figure 9I:
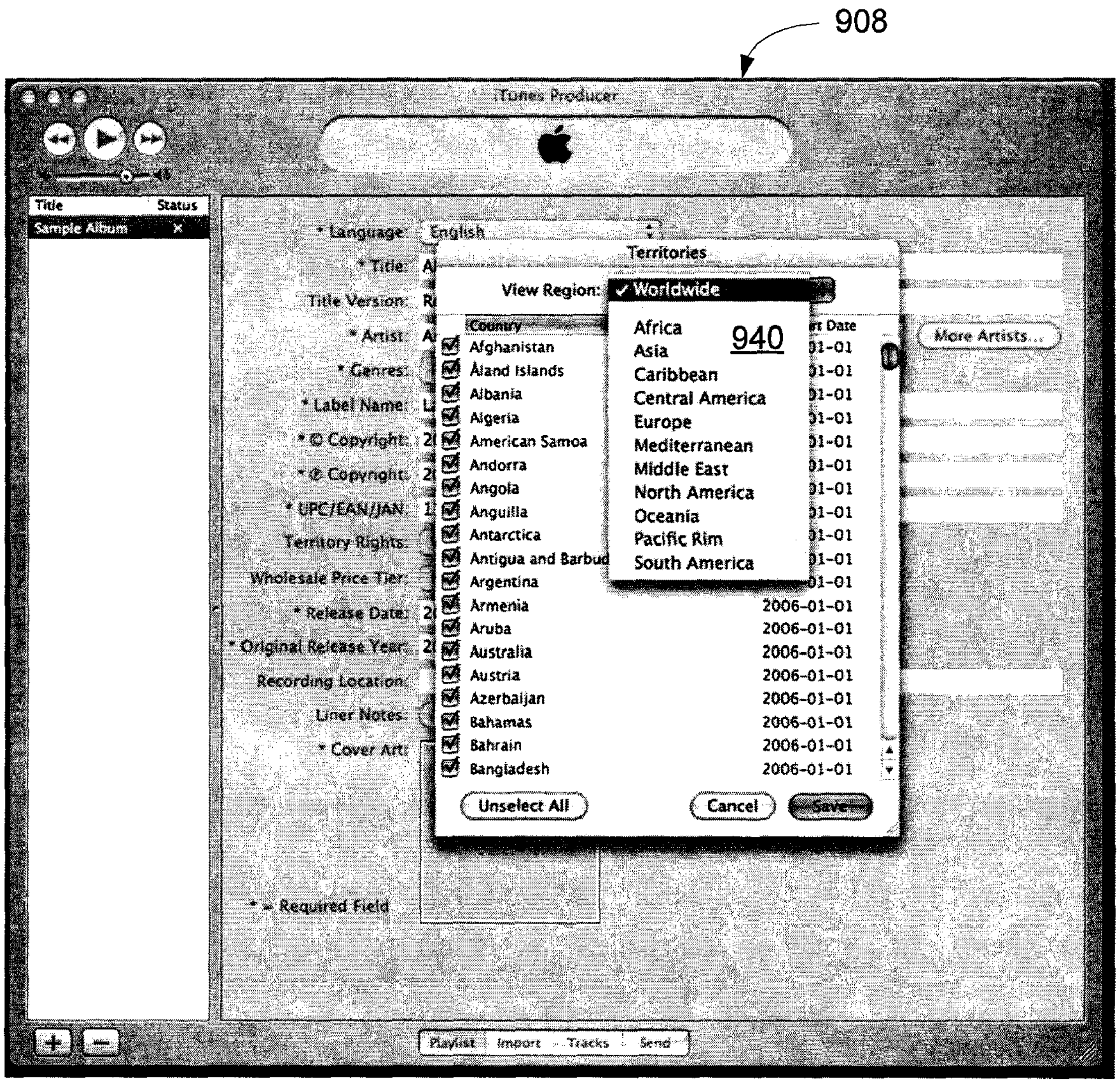

Additionally, the pop-up list 932 also facilitates a user in providing a custom selection of territory rights. In this regard, the pop-up list 932 includes a custom indicator 934 which, if selected, can cause a territories window 938 as illustrated in FIG. 9H to be presented (e.g., displayed). The territories window 938 allows a user to individually select countries to be selected as authorized territories for sale of the media collection. The territories window 938 includes a view region selector 940 that can assist the user in this regard. The view region selector 940, when selected, can present a pop-up list 942 as illustrated in FIG. 9I. The pop-up list 942 allows a user to select a particular region for which territory rights are to be selected. Once a particular region is selected, the territory window 938 presents the countries associated with that region. Once the appropriate countries have been selected, the custom territories grouping can be saved.

Returning to FIG. 9G, an edit list indicator 936 provided in the pop-up list 932 can be utilized to add the custom territory grouping to the pop-up list 932 for future selection. In other words, if a custom territory grouping has been saved, the edit list indicator 936 can be selected to add the custom territory group to the pop-up list 932.

Figure 9J:
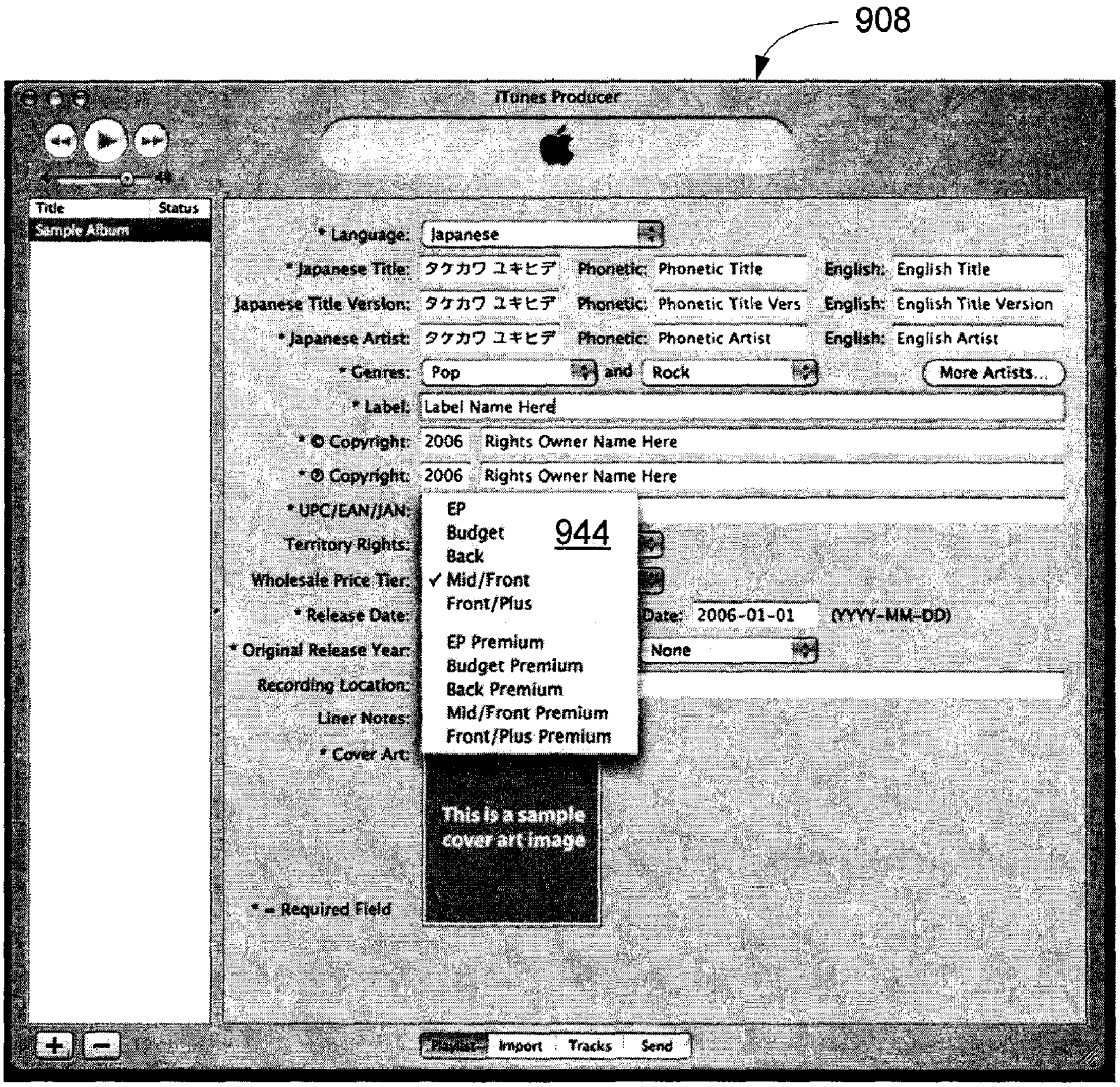

With respect to the wholesale price tier 906, a user can select or otherwise identify a price tier for the media collection. FIG. 9J illustrates a pop-up list 944 that can be presented to assist the user in providing a price tier. The pop-up list 944 contains different price tier descriptors that can be selected. In one embodiment, these price tiers are pricing designators that are associated with distribution contracts between the media content providers and a media distribution site providing sales or distribution for the media collection. In one embodiment, the price for the media collection (e.g., playlist) cannot exceed the sum of the prices for the tracks within the media collection. Hence, the suggested retail price for each track (as sold separately) will be automatically set to the single track price per the terms of the associated distribution contract, dependent upon the country of the purchaser.

Figure 9K:
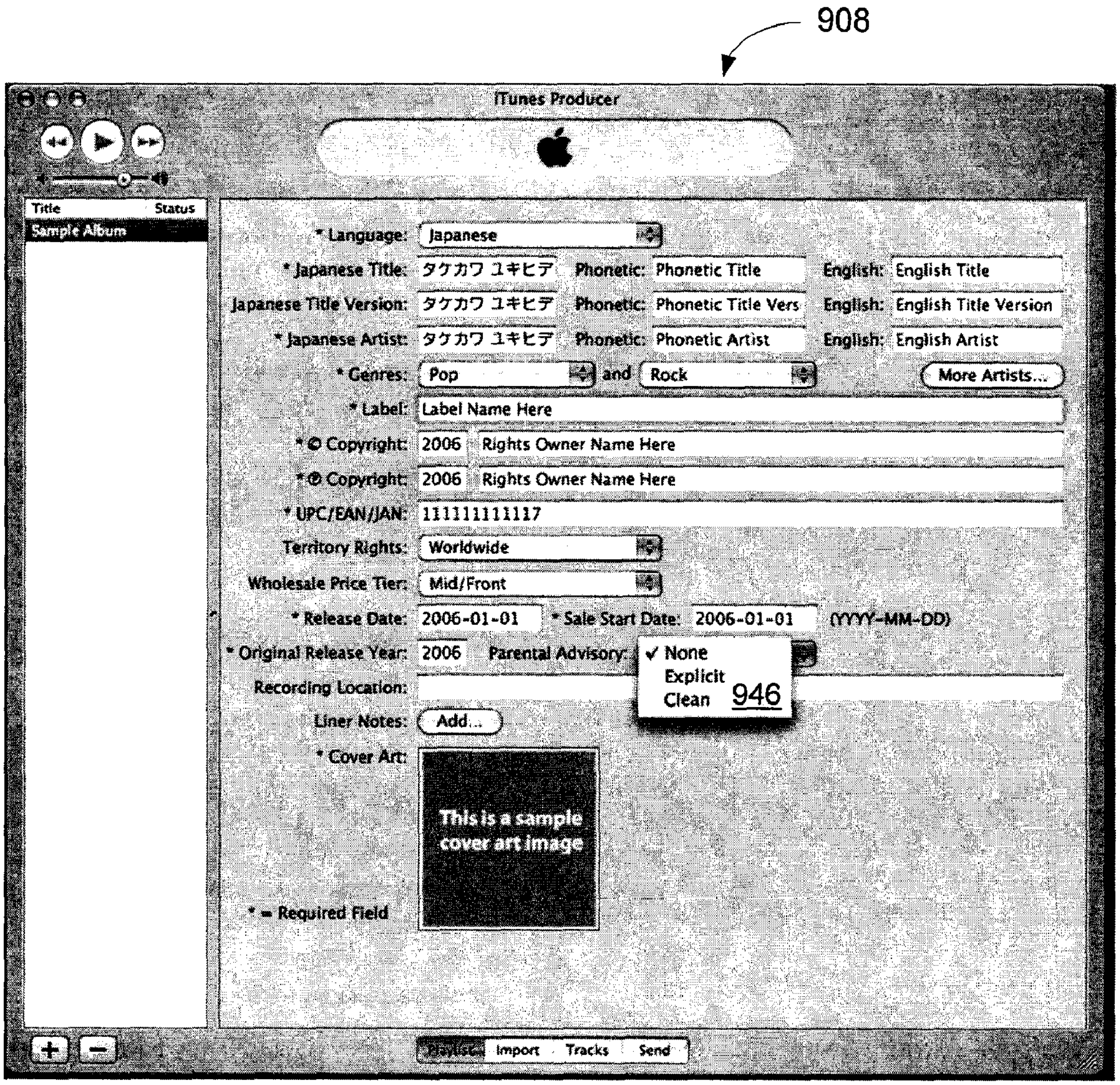

In providing a parental advisory indication, a pop-up list 946 can be presented as illustrated in FIG. 9K. The pop-up list 946 can assist a user in selecting one of a predetermined set of parental advisories. The pop-up list 946 allows a user to select "none", "explicit" or "clean".

In addition, the media collection information window 900 can also present an indication of whether or not the track is cleared for sale. Typically, the user will indicate whether or not the media collection is cleared for sale on a media distribution site. In one example, as shown in FIG. 9A, the cleared for sale indication is a check-box that the user can check or uncheck.

The media items (e.g., media content) that are to be included within a media collection (e.g., playlist) can be imported into the media submission program 110 from a compact disk (CD) or files on a storage device.

Figure 10:
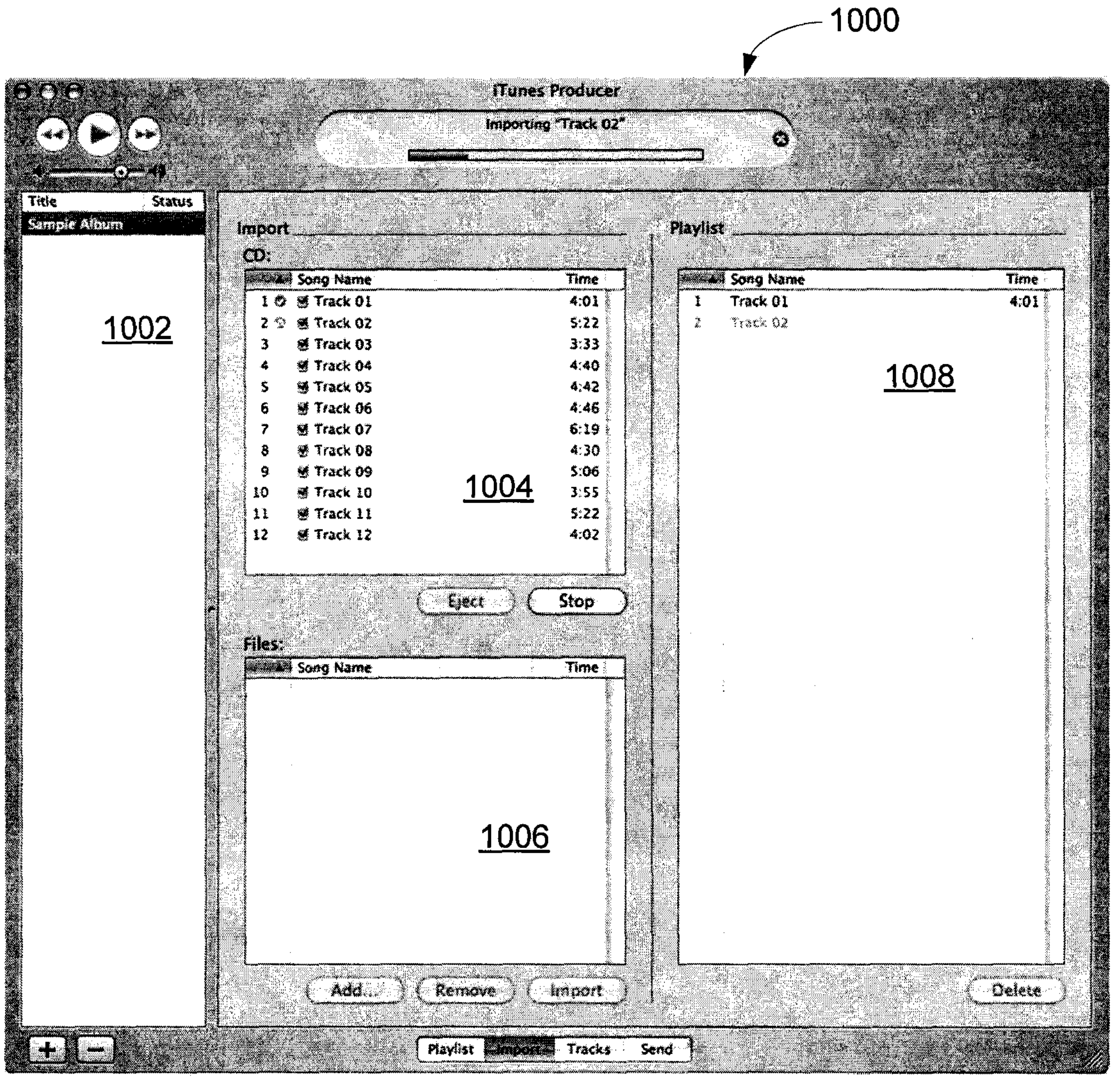
FIG. 10 illustrates a representative import window according to one embodiment of the invention.

FIG. 10 illustrates a representative import window 1000 according to one embodiment of the invention. The import window 1000 can be presented by the media submission program 110 illustrated in FIG. 1. The files can be imported from a compact disc (CD) or from a memory device (e.g., hard drive). The import window 1000 includes a playlist region 1002 that identifies a playlist ("Sample Album") to be processed. The import window 1000 also includes an import region having a CD import area 1004 and a file import area 1006. When a CD is inserted into the client machine 105, the songs on the CD can be listed in the CD import region 1004. Any of the songs listed in the CD import region 1004 can be selected to be imported into the playlist. As a track is imported into the playlist, the track is shown in a playlist region 1008. As shown in FIG. 10, the import window 1000 is currently importing track #2 from the CD import area 1004 to the playlist and is thus reflected in the playlist region 1008. To add files from the client machine 105, the files are added to the file import region 1006. From there, the files can be imported into the playlist and be reflected in the playlist region 1008. Once all of the tracks to be included in the playlist have been imported and are reflected in the playlist region 1008, information on each track can be provided by selecting the track button 1010.

Figure 11A:
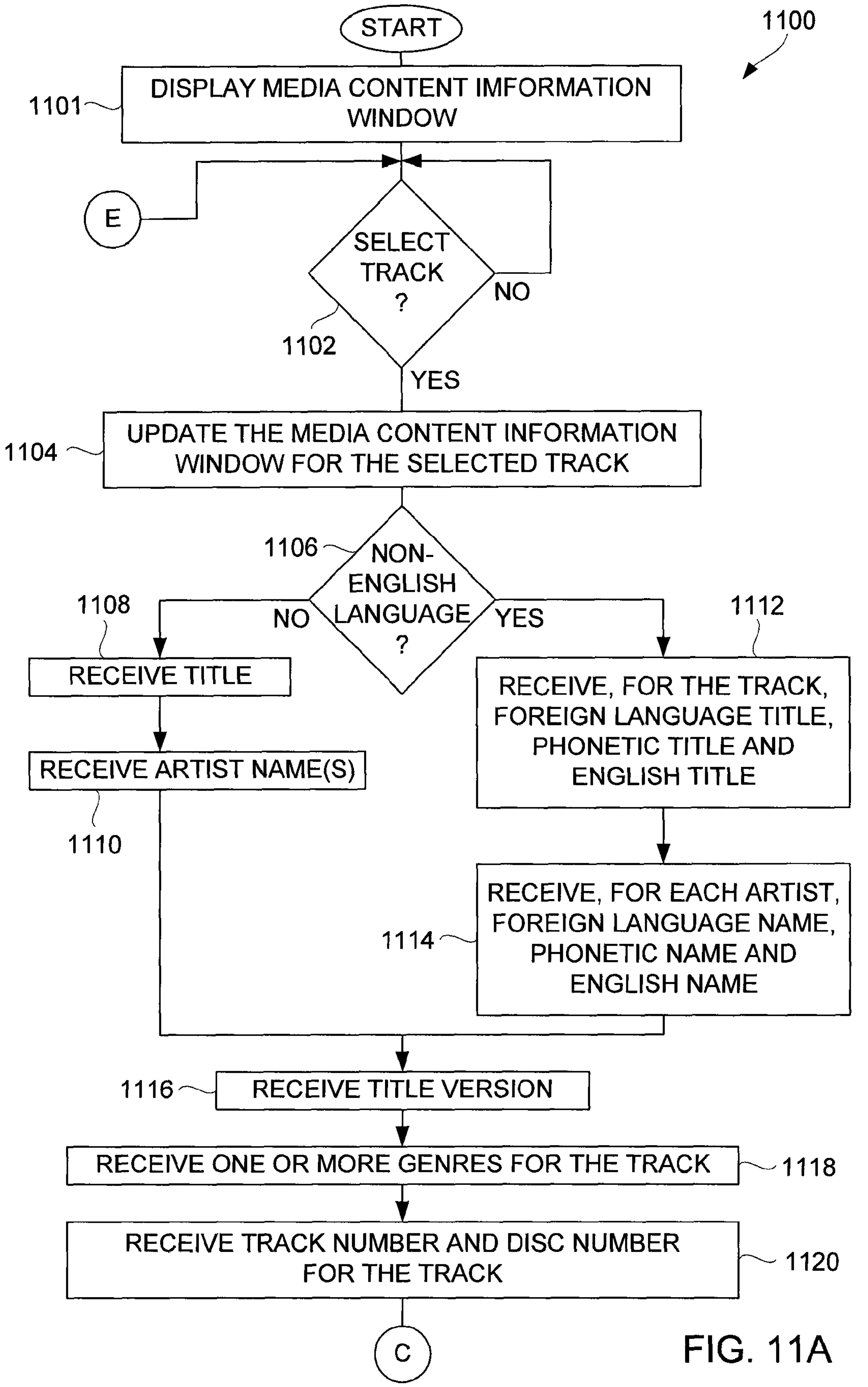
FIGS. 11A-11C are flow diagrams of a media content information acquisition process according to one embodiment of the invention.
Figure 11B:
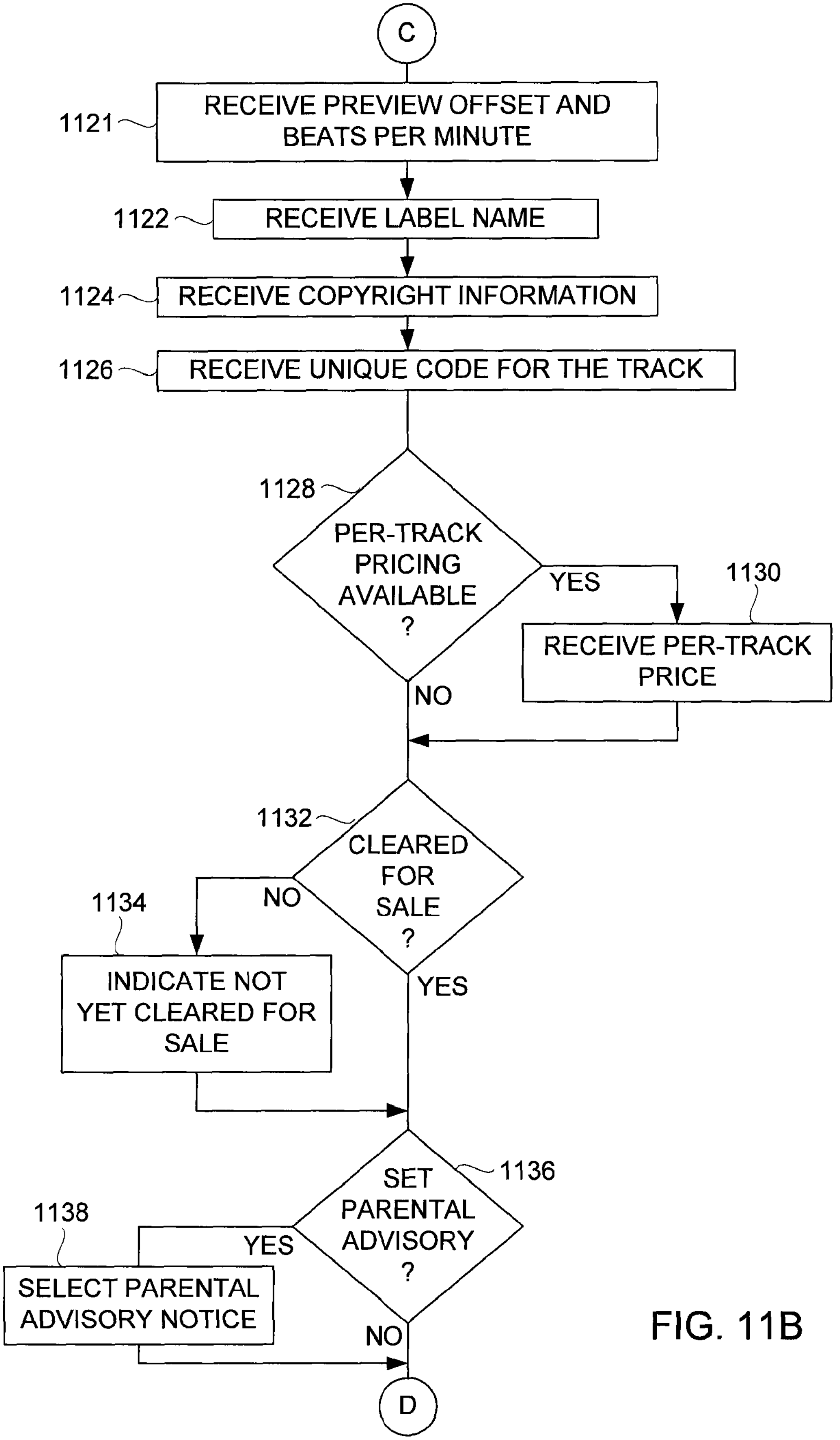
Figure 11C:
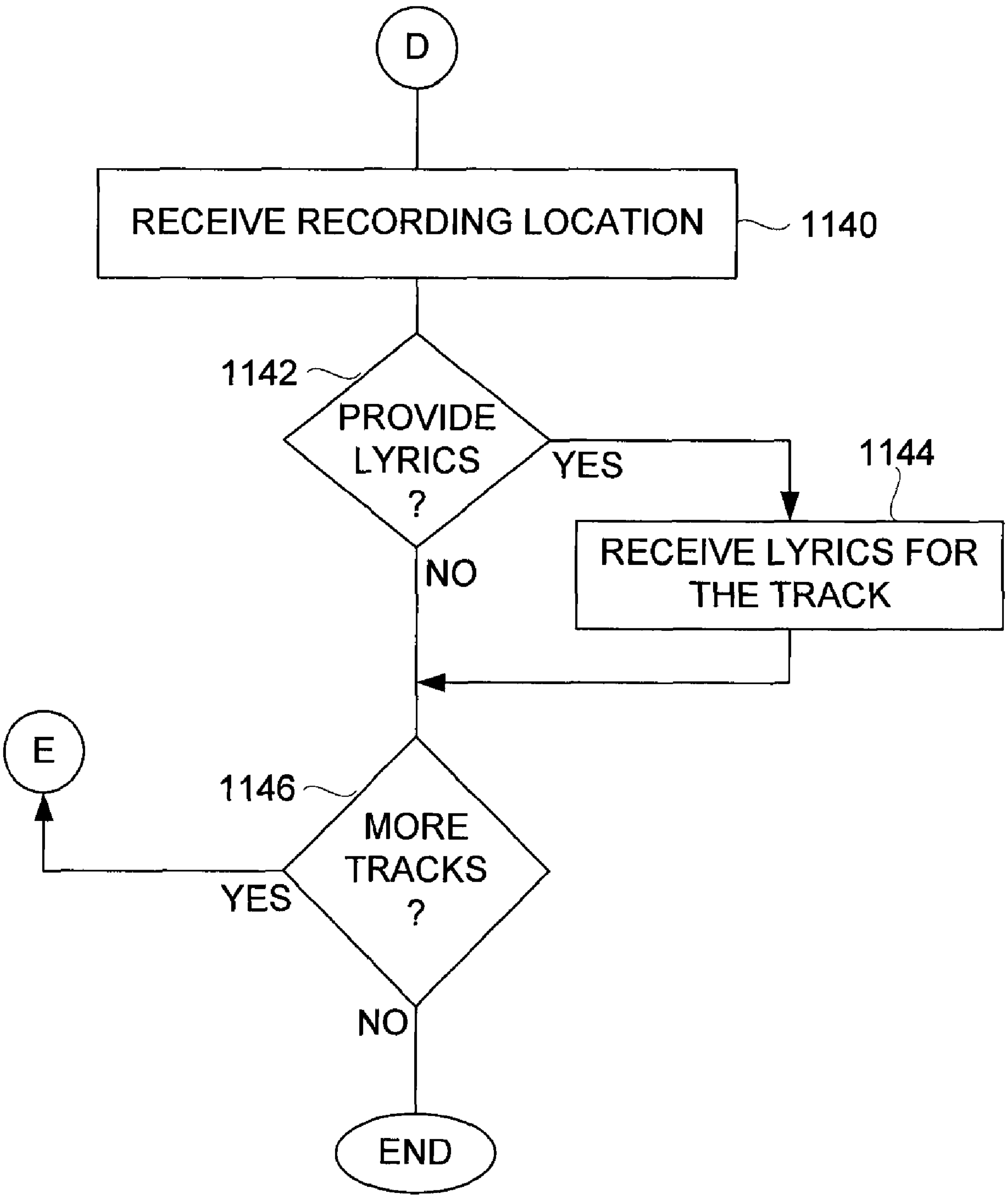

FIGS. 11A-11C are flow diagrams of a media content information acquisition process 1100 according to one embodiment of the invention. The media content information acquisition process 1100 is typically performed by a client machine, such as the client 105 illustrated in FIG. 1. More particularly, the media content information acquisition process 1100 can be performed by the media submission program 110 operating on the client 105 illustrated in FIG. 1.

Figure 12A:
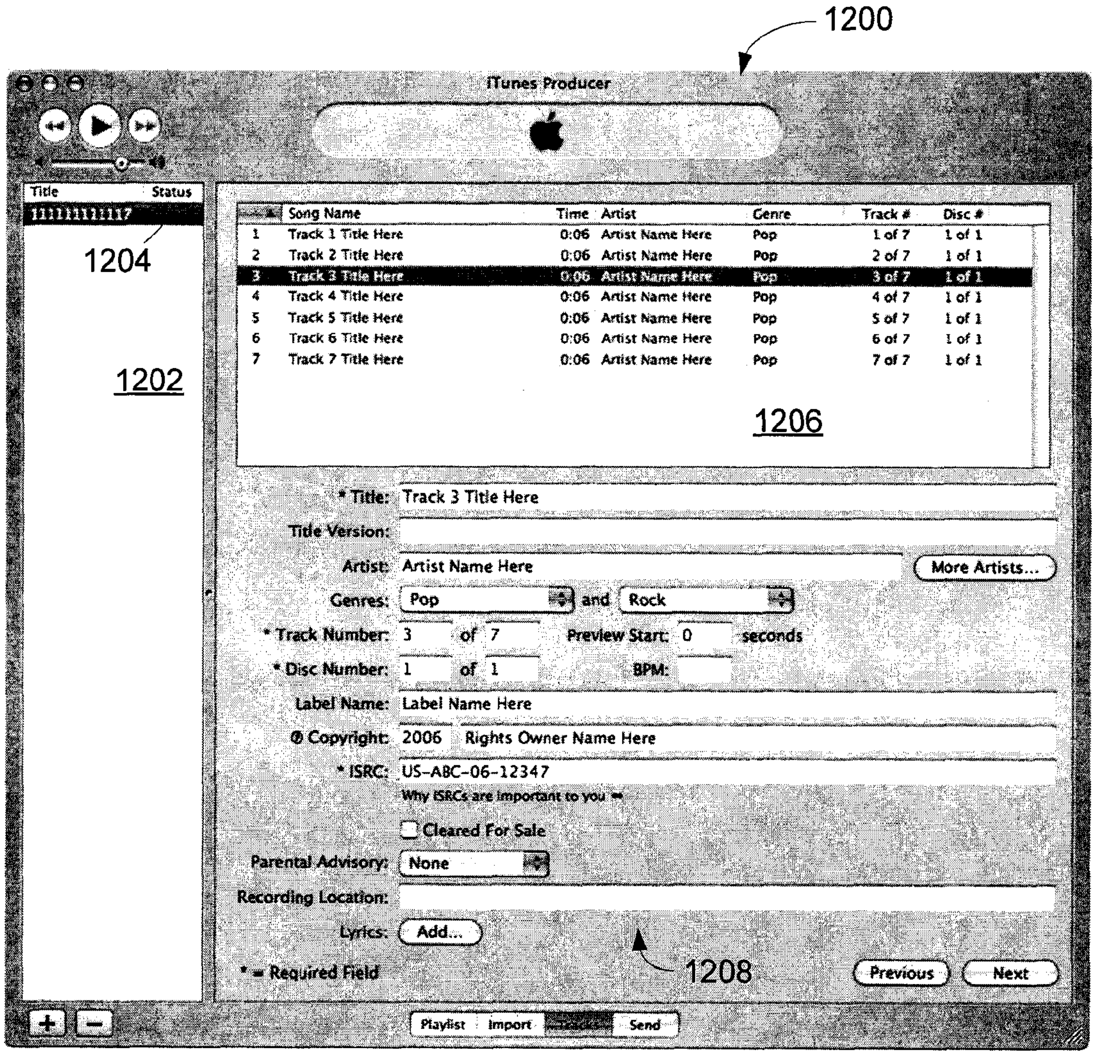
FIGS. 12A and 12B are representative screen shots that can be produced by a media submission program.
Figure 12B:
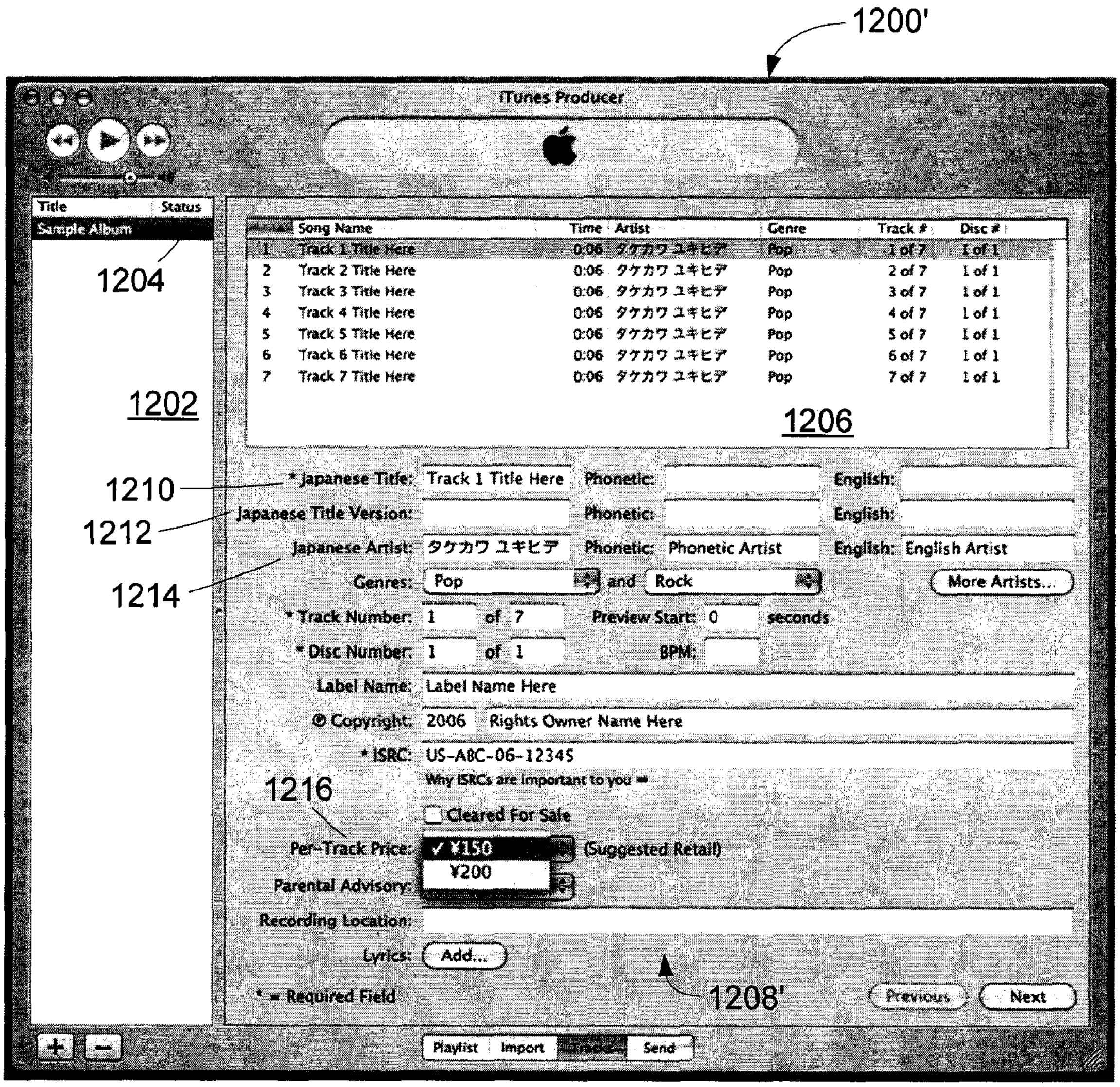

The media content information acquisition process 1100 initially displays 1101 a media content information window. FIGS. 12A and 12B are examples of media content information windows according to embodiments of the invention. The media content information window is used to acquire media content information and is further discussed in detail below with regard to FIGS. 12A and 12B.

In the media content information window, at least a portion of the media content information in the window can be initially provided by the media submission program 110 from previously acquired media collection information discussed above. Nevertheless, the media content information acquisition process 1100 is discussed below assuming that the user desires to provide the media content information regardless of whether any of the information is already known from the media collection information.

Once the media content information window is displayed 1100, a list of the tracks associated with the playlist is presented. These tracks were acquired and associated with a playlist (e.g., media collection) during an import process (e.g., import window 1000)). A user can then select one of the tracks and then proceed to enter media content information for that track. Hence, a decision 1102 determines whether a track has been selected from the media content information window. Once the decision 1102 determines that a track has been selected, the media content information window for the selected track can be updated 1104. In some cases, the media content information window for the selected track will contain information that has been carried over from information concerning the associated playlist. In other cases, the media content information window will have blank text entry areas or default selections or text.

Next, a decision 1106 determines whether the playlist is a non-English language playlist. When the decision 1106 determines that the playlist is an English language playlist, then the title for the selected track can be received 1108. In addition, one or more artist names to be associated with the selected track can be received 1110.

On the other hand, when the decision 1106 determines that the playlist is a non-English playlist, then the media content information window can be altered such as illustrated in FIG. 12B to facilitate entry of additional information concerning title and artist. In this regard, for the selected track, a foreign language title, a phonetic title, and an English title can be received 1112. In addition, for each artist, a foreign language name, a phonetic name, and an English name can be received 1114. Following the blocks 1110 and 1114, a title version can be received. Examples of title versions include "remix", "hidden track", "bonus track" or "live". Alternatively, in the case of a foreign-language playlist, the title version can be received as a foreign language, phonetic and English spellings for the title version.

Next, one or more genres for the track can be received 1118. For example, a first genre selection can be a primary genre, and a second genre selection can be a secondary genre. In addition, a track number and a disc number for the track can be received 1120. The track number and the disc number can correspond to track placement with reference to a compact disc (CD) version of the playlist. Still further, a preview start offset and beats per minute (BPM) for the track can be received 1121.

In addition, a label name can be received 1122. The label name for the playlist can be provided here by default or can be entered by the user. Copyright information can also be received 1124. For example the copyright information can specify the year in which the sound recording for the selected track was copyrighted. A unique song code for the track can also be received 1126. As an example, the unique code can be the ISRC for the track.

Next, a decision 1128 determines whether a per-track pricing is available. As an example, with a Japanese language playlist, a per-track price can be made available. Hence, if the playlist is a Japanese playlist, a per-track pricing would be determined to be available at a media distribution site. In any case, regardless of the language of the playlist, when the decision 1128 determines that a per-track pricing is available, a per-track price can be received 1130.

Following the block 1130, or following the decision 1128 when per-track pricing is not available, a decision 1132 determines whether the track is cleared for sale. In one embodiment, by default, the selected track can be available for sale on the sales start date for the playlist. However, when the decision 1132 determines, such as by user action or inaction, that the track is not cleared for sale, then the track is indicated 1134 as not being cleared for sale. If the track is not cleared for sale, a media distribution site will not make the track available. In one embodiment, for a playlist to be available for sale at a media distribution site, all of the tracks of the playlist must be cleared for sale.

Following the block 1134, or directly following the decision 1132 when the track is cleared for sale, a decision 1136 determines whether a parental advisory is to be set. In one embodiment, the parental advisory is set by default to "none". When the decision 1136 determines that a parental advisory is to be set, a parental advisory indicator is selected 1138. As an example, the parental advisory indicator can be designated as "none", "explicit", or "clean".

Following the block 1138, or directly following the decision 1136 when a parental advisory is not to be set, a recording location can be received 1140. The recording location is the location where the track was recorded. Next, a decision 1142 determines whether lyrics are to be provided. When the decision 1142 determines that lyrics are to be provided, lyrics for the track are received 1144. As an example, the media content information window can include a region where the lyrics can be entered and/or a region where a particular file containing the lyrics can be specified.

Following the block 1144, as well as directly following the decision 1142 when lyrics are not being provided, a decision 1146 determines whether more tracks are to be similarly processed. When the decision 1146 determines that more tracks are to be similarly processed to acquire media content information for such tracks, the media content information acquisition process 1100 returns to repeat the decision 1102 so that another track can be selected and processed. Alternatively, when the decision 1146 determines that no more tracks are to be processed, the media content information acquisition process 1100 ends.

It should be noted that the media collection information acquisition process 800 and the media content information acquisition process 1100 are typically used in submitting media content to a media distribution site. In one embodiment, the media collection acquisition process 800 pertains to providing information pertaining to a media collection (e.g., playlist), and the media content information acquisition process 1100 pertains to providing information for individual media items within the media collection. Although the media collection information acquisition process 800 and the media content information acquisition process 1100 are often used together, it should be recognized that these processes can also be used separately.

FIGS. 12A and 12B are representative screen shots that can be produced by a media submission program. These representative screen shots are used to assist a user to provide information that pertains to particular media items that are part of a media collection that is being prepared for submission to a media distribution site. The media submission program can, for example, be the media submission program 110 illustrated in FIG. 1.

FIG. 12A is a screen shot of a media content information window 1200 according to one embodiment of the invention. The media content information window 1200 includes a playlist area 1202 where one or more playlists and their status can be specified. In this example, there is one playlist 1204 in the playlist area 1202 and such playlist is shown as being selected. The media content information window 1200 also includes a track area 1206 (e.g., track window) that displays tracks (e.g., media tracks such as audio tracks) associated with the selected playlist. In the example illustrated in FIG. 12A, the selected playlist 1204 has seven tracks listed in the track area 1206. Further, the media content information window 1200 includes a track information area 1208. The track information area 1208 includes text entry boxes, menus, lists or other user interface controls to assist a user in providing the information concerning the various tracks listed in the track area 1206. As shown in FIG. 12A, the track 3 is shown highlighted in the track area 1206. Upon such selection of track 3, the track information associated with track 3 can be provided in the track information area 1208.

In this embodiment, the track information that can be provided in the track information area 1208 includes a title, a title version, one or more artist names, one or more genres, track number, disc number, preview start offset, bits per minute (BPM), label name, copyright information, unique track code (e.g., ISRC), parental advisory, recording location, and lyrics. In addition, the track information area 1208 also can present an indication of whether or not the track is cleared for sale. In this example, the cleared for sale indication is a check-box that the user can check or uncheck.

As different tracks are selected from the track area 1206, the information for the selected track can be provided in the track information area 1208. In some cases, the track information is carried forward from prior data entry, such as information entered with respect to a media collection information window, such as the media collection information window 900 illustrated in FIG. 9A.

FIG. 12B illustrates a screen shot of a modified media content information window 1200'. The modified media content information window is generally similar to the media content information window 1200 illustrated in FIG. 12A. However, the media content information window 1200' is suitable for use with non-English playlists, such as a Japanese playlist. In this regard, the track information area 1208' is at least partially different from the track information area 1208 of the media content information window 1200. More specifically, the track information area 1208' includes user interface controls so that the title 1210, the title version 1212, and one or more artists 1214 can be provided in Japanese, phonetically and in English. Furthermore, the media content information window 1200' can include a per-track price control 1216 that enables a user to select a per-track pricing for a selected track.

Figure 13:
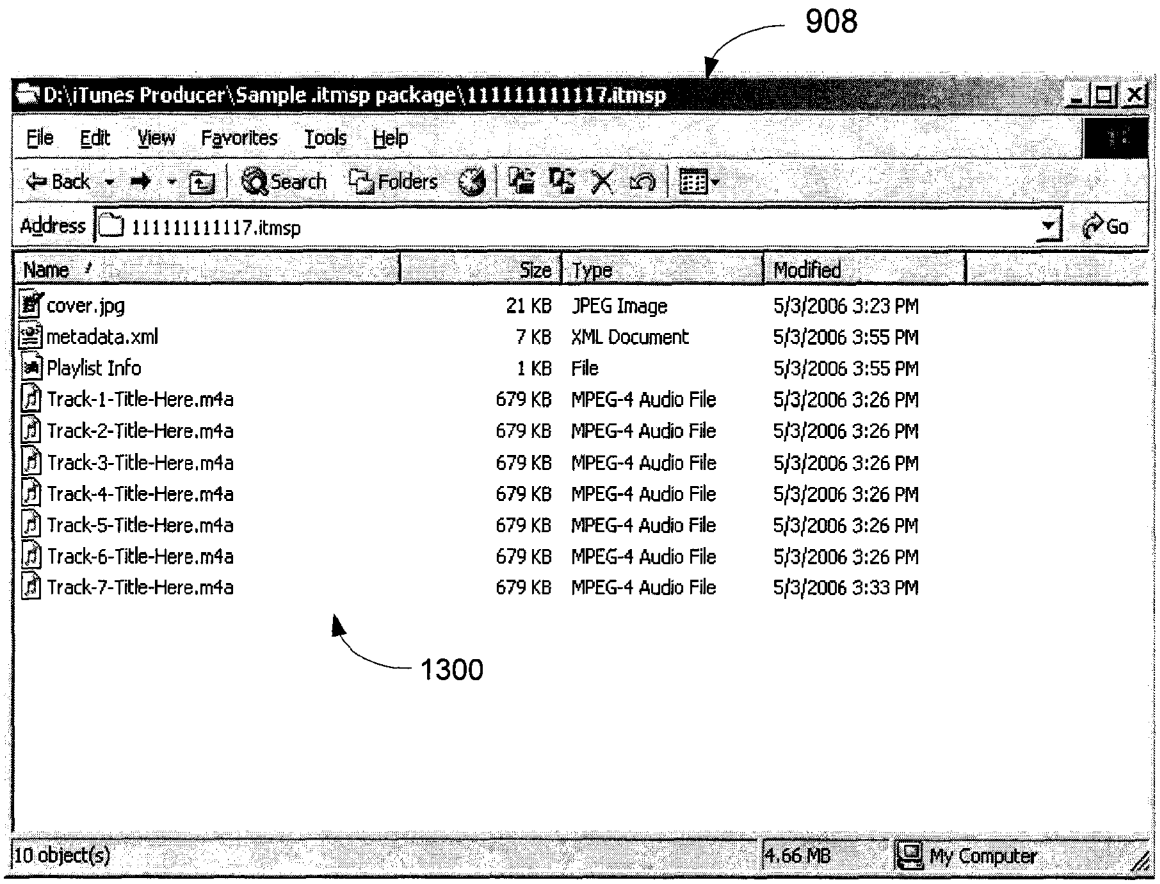
FIG. 13 is a screen shot of a representative media package that has been prepared for submission according to one embodiment of the invention.

FIG. 13 is a screen shot of a representative media package 1300 that has been prepared for submission according to one embodiment of the invention. The media package 1300 is named "111111111117.itmsp" and includes ten (10) objects. More particularly, the media package 1300 includes an image file ("cover.jpg"), a metadata file ("metadata.xml"), playlist ("Playlist.lnfo"), and audio tracks (Tracks 1-7).

Accordingly, one component of a media package is a metadata file that contains information describing the media to be included in the media package. In one embodiment, the metadata file can be a markup language file, e.g., an XML file. The metadata file can include a header region (<package>), a media collection metadata region (<album>), and a media item metadata region (<album tracks>). A first example of such a representative metadata file in a markup language format is as follows:

```
<?xml version="1.0" encoding="UTF-8" ?>
– <package>
    <major__version>1</major__version>
    <minor__version>1</minor__version>
    <language>en</language>
    <provider>iTunes Producer</provider>
    <tool__name>iTunes Producer</tool__name>
    <tool__version>1.4</tool__version>
  – <album>
      <album__upc>111111111117</album__upc>
      <album__title>Album Title Here</album__title>
      <album__title__version>Remixes</album__title__version>
      <album__release__date>2006-01-01</album__release__date>
        <album__original__release__year>2006</album__
        original__release__year>
      <album__label__name>Label Name Here</album__label__name>
    – <album__genres>
        <genre>Pop</genre>
        <genre>Rock</genre>
      </album__genres>
      <album__copyright__cline>2006 Rights Owner Name
        Here</album__copyright__cline>
      <album__copyright__pline>2006 Rights Owner Name
        Here</album__copyright__pline>
    – <album__artwork__files>
      – <file>
          <file__name>cover.jpg</file__name>
          <checksum
            type="md5">F5244DEAE24C692ADF66352A4952E
            E5B</checksum>
        </file>
      </album__artwork__files>
    – <album__products>
      – <product>
          <territory>World</territory>
          <sales__start__date>2006-01-01</sales__start__date>
      <wholesale__price__tier>3</wholesale__price__tier>
    </product>
  </album__products>
– <album__artists>
  – <artist>
      <name>Artist Name Here</name>
    – <roles>
        <role>Primary</role>
      </roles>
    </artist>
  </album__artists>
– <album__tracks>
  – <track>
      <track__isrc>USABC0612345</track__isrc>
      <track__title>Track 1 Title Here</track__title>
      <track__volume__number>1</track__volume__number>
      <track__volume__count>1</track__volume__count>
      <track__track__number>1</track__track__number>
      <track__track__count>7</track__track__count>
    – <track__audio__file>
        <file__name>Track-1-Title-Here.m4a</file__name>
        <checksum
          type="md5">B8FFF9A67E33B422B0F23DBDF
          67DBFF4</checksum>
      </track__audio__file>
      <track__cleared__for__sale>false</track__cleared__for__sale>
        <track__preview__start__index>0.0</track__
        preview__start__index>
    – <track__artists>
      – <artist>
          <name>□□□□ □□□□</name>
        </artist>
      </track__artists>
    – <track__products>
      – <product>
          <territory>World</territory>
        </product>
      </track__products>
    </track>
  – <track>
      <track__isrc>USABC0612346</track__isrc>
      <track__title>Track 2 Title Here</track__title>
      <track__volume__number>1</track__volume__number>
```

-continued

```
        <track__volume__count>1</track__volume__count>
        <track__track__number>2</track__track__number>
        <track__track__count>7</track__track__count>
      – <track__audio__file>
          <file__name>Track-2-Title-Here.m4a</file__name>
        <checksum
          type="md5">316E50FAA25C8409EA77C7579
          D973501</checksum>
      </track__audio__file>
      <track__cleared__for__sale>false</track__cleared__for__sale>
        <track__preview__start__index>0.0</track__preview__start__index>
    – <track__products>
      – <product>
          <territory>World</territory>
        </product>
      </track__products>
    </track>
  – <track>
      <track__isrc>USABC0612347</track__isrc>
      <track__title>Track 3 Title Here</track__title>
      <track__volume__number>1</track__volume__number>
      <track__volume__count>1</track__volume__count>
      <track__track__number>3</track__track__number>
      <track__track__count>7</track__track__count>
    – <track__audio__file>
        <file__name>Track-3-Title-Here.m4a</file__name>
        <checksum
          type="md5">2A64D861B15173DC5728FF9FE
          251D826</checksum>
      </track__audio__file>
      <track__cleared__for__sale>false</track__cleared__for__sale>
        <track__preview__start__index>0.0</track__preview__start__index>
    – <track__products>
      – <product>
          <territory>World</territory>
        </product>
      </track__products>
    </track>
  – <track>
      <track__isrc>USABC0612348</track.isrc>
      <track__title>Track 4 Title Here</track__title>
      <track__volume__number>1</track__volume__number>
      <track__volume__count>1</track__volume__count>
      <track__track__number>4</track__track__number>
      <track__track__count>7</track__track__count>
    – <track__audio__file>
        <file__name>Track-4-Title-Here.m4a</file__name>
        <checksum
          type="md5">9051BB5F14FCD8600DA5484E9
          E1A2129</checksum>
      </track__audio__file>
      <track__cleared__for__sale>false</track__cleared__for__sale>
        <track__preview__start__index>0.0</track__preview__start__index>
    – <track__products>
      – <product>
          <territory>World</territory>
        </product>
      </track__products>
    </track>
  – <track>
      <track__isrc>USABC0612349</track__isrc>
      <track__title>Track 5 Title Here</track__title>
      <track__volume__number>1</track__volume__number>
      <track__volume__count>1</track__volume__count>
      <track__track__number>5</track__track__number>
      <track__track__count>7</track__track__count>
    – <track__audio__file>
        <file__name>Track-5-Title-Here.m4a</file__name>
        <checksum
          type="md5">2768415A1D02D178CF94AEF8A
          7471C60</checksum>
      </track__audio__file>
      <track__cleared__for__sale>false</track__cleared__for__sale>
        <track__preview__start__index>0.0</track__preview__start__index>
    – <track__products>
      – <product>
          <territory>World</territory>
        </product>
      </track__products>
```

-continued

```
  </track>
– <track>
    <track__isrc>USABC0612350</track__isrc>
    <track__title>Track 6 Title Here</track__title>
    <track__volume__number>1</track__volume__number>
    <track__volume__count>1</track__volume__count>
    <track__track__number>6</track__track__number>
    <track__track__count>7</track__track__count>
  – <track__audio__file>
      <file__name>Track-6-Title-Here.m4a</file__name>
      <checksum
        type="md5">906F33F81F61A3BBCC4AF565C0
        62DAEB</checksum>
    </track__audio__file>
    <track__cleared__for__sale>false</track__cleared__for__sale>
      <track__preview__start__index>0.0</track__preview__start__index>
      – <track__products>
        – <product>
            <territory>World</territory>
          </product>
        </track__products>
      </track>
    – <track>
        <track__isrc>USABC0612351</track__isrc>
        <track__title>Track 7 Title Here</track__title>
        <track__volume__number>1</track__volume__number>
        <track__volume__count>1</track__volume__count>
        <track__track__number>7</track__track__number>
        <track__track__count>7</track__track__count>
      – <track__audio__file>
          <file__name>Track-7-Title-Here.m4a</file__name>
          <checksum
            type="md5">9D324D994DC2CCFDB7112A66F
            32D26AA</checksum>
        </track__audio__file>
        <track__cleared__for__sale>false</track__cleared__for__sale>
          <track__preview__start__index>0.0</track__
          preview__start__index>
      – <track__products>
        – <product>
            <territory>World</territory>
          </product>
        </track__products>
      </track>
    </album__tracks>
  </album>
</package>
```

A second example of such a representative metadata file in a markup language format is as follows:

```
    <?xml version="1.0" encoding="UTF-8" ?>
– <package>
      <major__version>1</major__version>
      <minor__version>2</minor__version>
      <language>en</language>
      <provider>iTunes Producer</provider>
      <tool__name>iTunes Producer</tool__name>
      <tool__version>1.5.1</tool__version>
  – <album>
        <album__upc>000000000123</album__upc>
    <album__title>Album Title Here</album__title>
    <album__title__version>Remixes</album__title__version>
    <album__release__date>2003-02-15</album__release__date>
      <album__original__release__year>2003</album__original__release__
      year>
    <album__label__name>ABC Label</album__label__name>
– <album__genres>
      <genre>Rock</genre>
      <genre>Alternative</genre>
    </album__genres>
    <album__explicit__lyrics>explicit</album__explicit__lyrics>
    <album__copyright__cline>2003 ABC
      Label</album__copyright__cline>
    <album__copyright__pline>2003 ABC
      Label</album__copyright__pline>
– <album__recording__location>
      <description>Test</description>
    </album__recording__location>
– <album__artwork__files>
  – <file>
        <file__name>cover.jpg</file__name>
        <checksum
          type="md5">F5244DEAE24C692ADF66352A4952E
          E5B</checksum>
      </file>
    </album__artwork__files>
    <album__liner__notes>Album liner notes
        here.</album__liner__notes>
– <album__products>
  – <product>
        <territory>CA</territory>
        <sales__start__date>2003-02-15</sales__start__date>
        <wholesale__price__tier>3</wholesale__price__tier>
      </product>
  – <product>
        <territory>US</territory>
        <sales__start__date>2003-02-15</sales__start__date>
        <wholesale__price__tier>3</wholesale__price__tier>
      </product>
    </album__products>
– <album__artists>
  – <artist>
        <name>Artist Name Here</name>
    – <roles>
          <role>Primary</role>
        </roles>
      </artist>
  – <artist>
        <name>Another Artist Here</name>
    – <roles>
          <role>Performer</role>
        </roles>
      </artist>
    </album__artists>
– <album__tracks>
  – <track>
        <track__isrc>USABC0512345</track__isrc>
        <track__title>Track 1 Title</track__title>
        <track__explicit__lyrics>explicit</track__explicit__lyrics>
        <track__lyrics>Track 1 lyrics here.</track__lyrics>
        <track__volume__number>1</track__volume__number>
        <track__volume__count>1</track__volume__count>
        <track__track__number>1</track__track__number>
        <track__track__count>4</track__track__count>
    – <track__audio__file>
          <file__name>Track-1-Title.m4a</file__name>
          <checksum
            type="md5">11D77BB290BF0F227054BD0F6
            2621AF7</checksum>
        </track__audio__file>
        <track__cleared__for__sale>true</track__cleared__for__sale>
        <track__gapless__play>true</track__gapless__play>
          <track__preview__start__index>60.0</track__
          preview__start__index>
    – <track__artists>
      – <artist>
            <name>Artist Name Here</name>
        – <roles>
              <role>Primary</role>
            </roles>
          </artist>
        </track__artists>
    – <track__products>
      – <product>
            <territory>CA</territory>
          </product>
      – <product>
            <territory>US</territory>
          </product>
        </track__products>
      </track>
  – <track>
        <track__isrc>USABC0512346</track__isrc>
```

-continued

```
<track_title>Track 2 Title</track_title>
<track_explicit_lyrics>explicit</track_explicit_lyrics>
<track_volume_number>1</track_volume_number>
<track_volume_count>1</track_volume_count>
<track_track_number>2</track_track_number>
<track_track_count>4</track_track_count>
- <track_audio_file>
<file_name>Track-2-Title.m4a</file_name>
<checksum
type="md5">9277A449FABA9F3413105782A
6D6B1D7</checksum>
</track_audio_file>
<track_cleared_for_sale>true</track_cleared_for_sale>
<track_gapless_play>false</track_gapless_play>
<track_preview_start_index>0.0</track_
preview_start_index>
- <track_products>
- <product>
<territory>CA</territory>
</product>
- <product>
<territory>US</territory>
</product>
</track_products>
</track>
- <track>
<track_isrc>USABC0512347</track_isrc>
<track_title>Track 3 Title</track_title>
<track_explicit_lyrics>clean</track_explicit_lyrics>
<track_beats_per_minute>55</track_beats_per_minute>
<track_volume_number>1</track_volume_number>
<track_volume_count>1</track_volume_count>
<track_track_number>3</track_track_number>
<track_track_count>4</track_track_count>
- <track_audio_file>
<file_name>Track-3-Title.m4a</file_name>
<checksum
type="md5">84C410E3D151AE0E388F6A9C2
7D2B6FA</checksum>
</track_audio_file>
<track_cleared_for_sale>true</track_cleared_for_sale>
<track_gapless_play>false</track_gapless_play>
<track_preview_start_index>0.0</track_preview_start_index>
- <track_products>
- <product>
<territory>CA</territory>
</product>
- <product>
<territory>US</territory>
</product>
</track_products>
</track>
+ <track>
</album_tracks>
</album>
</package>
```

In the above second example, among other things, the representative metadata file includes tags (i.e., "track_gap-less_play") for conveying information regarding gapless playback. Also, as to sales start dates, such dates can be different for different territories (e.g., countries/regions). In the above second example, the tags (i.e., "sales_start_date") is used to convey information on sales start dates in particular territories.

Figure 14:
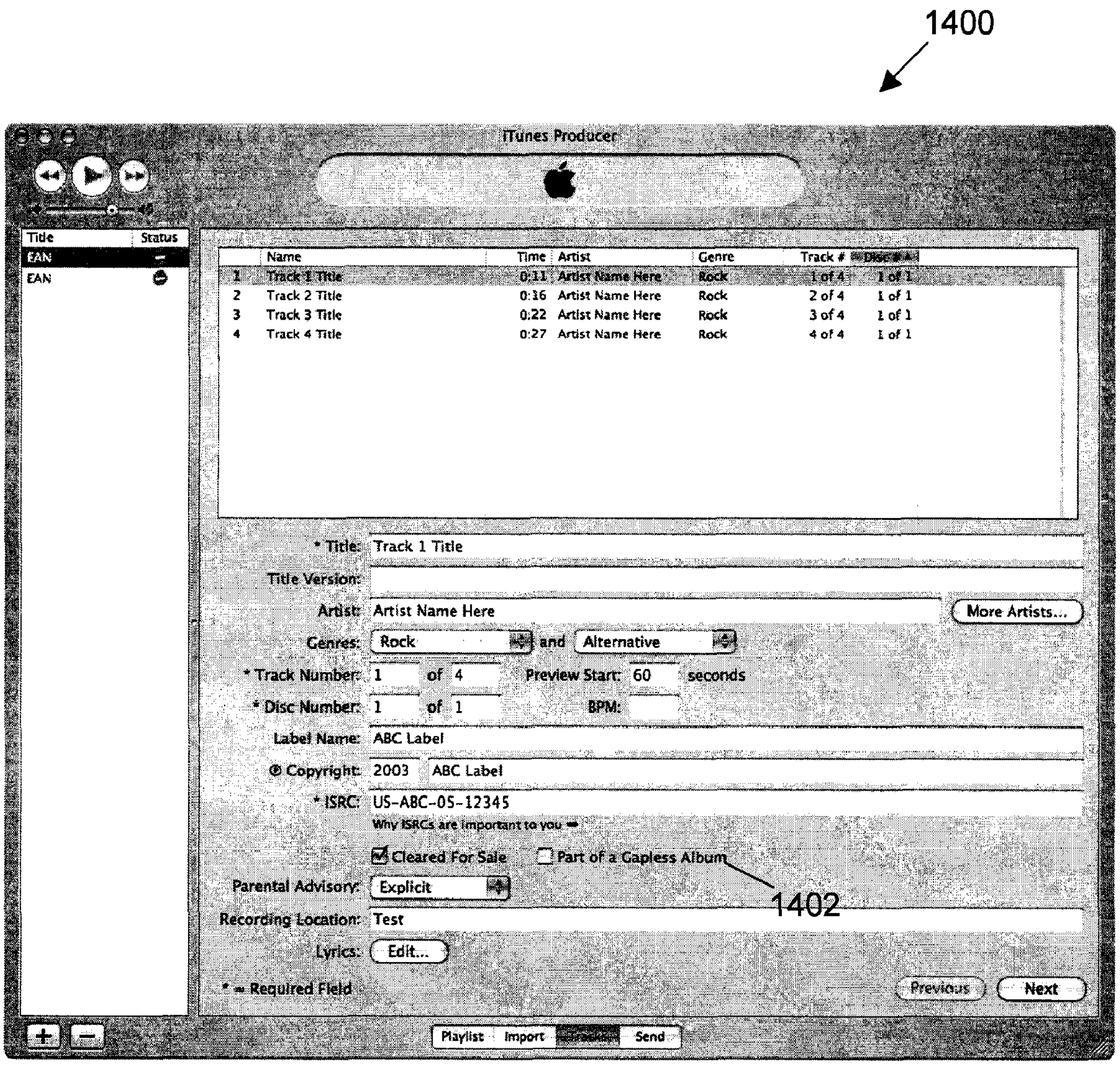
FIG. 14 is another representative screen shot that can be produced by a media submission program.

FIG. 14 is another representative screen shot that can be produced by a media submission program. These representative screen shot can be used to assist a user to provide information that pertains to particular media items that are part of a media collection that is being prepared for submission to a media distribution site. The media submission program can, for example, be the media submission program 110 illustrated in FIG. 1. More specifically, FIG. 14 is a screen shot of a media content information window 1400 according to one embodiment of the invention. The media content information window 1400 is generally similar to the media content information window 1200 illustrated in FIG. 12A, but pertains to a different submission.

The media content information window 1400 includes a playlist area 1402 where one or more playlists and their status can be specified. In this example, there are two playlists in the playlist area 1402 and the first of the playlists 1404 is shown as being selected. The media content information window 1400 also includes a track area 1406 (e.g., track window) that displays tracks (e.g., media tracks such as audio tracks) associated with the selected playlist. In the example illustrated in FIG. 14, the selected playlist 1404 has four tracks listed in the track area 1606. Further, the media content information window 1400 includes a track information area 1408. The track information area 1408 includes text entry boxes, menus, lists or other user interface controls to assist a user in providing the information concerning the various tracks listed in the track area 1406. As shown in FIG. 14, the track 1 is shown highlighted in the track area 1406. Upon such selection of track 1, the track information associated with track 1 can be provided in the track information area 1408.

In the example illustrated in FIG. 14, the track information that can be provided in the track information area 1408 includes a title, a title version, one or more artist names, one or more genres, track number, disc number, preview start offset, bits per minute (BPM), label name, copyright information, unique track code (e.g., ISRC), parental advisory, recording location, and lyrics. In addition, the track information area 1408 also can present an indication of whether or not the track is cleared for sale. In this example, the cleared for sale indication is a check-box provided near a label (e.g., "Cleared for Sale") that the user can check or uncheck. Further, the track information area 1408 can also present an indication of whether or not the track can be playback in a gapless manner. In this example, the gapless playback indication is a check-box provided near a label (e.g., "Part of a Gapless Album") that the user and check or uncheck. In one embodiment, the gapless playback indication can be used to inform the media submission system 110 whether or not the associated audio track is gapless or can be play in a gapless manner. Hence, when a user eventually acquires a media item (e.g., from the media distribution site 102), the electronic device that is to playback the audio track can understand that the audio track is gapless or can be played back in a gapless manner. Gapless playback pertains to playback of media items, such as audio tracks, such that as one track concludes another track starts without any significant gap in meaningful audio. Additional details on gapless playback are contained in U.S. patent application Ser. No. 11/519,389, filed Sep. 11, 2006, and entitled "PLAYBACK OF COMPRESSED MEDIA FILES WITHOUT QUANTIZATION GAPS," which is hereby incorporated herein by reference.

Another aspect of the invention pertains to importing information (e.g., metadata) for playlists and/or tracks within the playlists. Here, data can be provided by a tab-delimited file. Instead of (or in addition to) a user interacting with one or both of a media window collection window and a media content information window, a user can specify a properly formatted tab-delimited file containing the data.

As before, a playlist is created. Some information concerning the playlist can be provided. At a minimum, at least one identifying field is specified, namely, a unique identifier (e.g., UPC or EAN) for the playlist. Then, the media content for media items can be imported for the playlist (e.g., FIG. 10). The media content for the media items should be imported in the final order so that the data import is properly processed. Next, data is imported into the playlist from a tab-delimited file that is specified. In one implementation, any fields that cannot be imported will be displayed as "Skipped Fields." This includes field names that are misspelled or contain fields that are not acceptable for import (see below for a list of data that can be imported).

In one embodiment, the tab-delimited file should only include those field names for which you want to import data. For any field that you do not have data, the media submission program will import the blank data and overwrite any previously entered data. Furthermore, in order to successfully import data, the tab-delimited file should include at least data for a unique identifier (e.g., one of UPC, EAN, and JAN), Album Title, Album Artist, Track Title, Track Number, and Disc Number.

In one implementation, the following fields can be imported.

"UPC" or "EAN" or "JAN"
Language
Album Title
Album Phonetic Title
Album English Title
Album Title Version
Album Phonetic Title Version
Album English Title Version
Album Artist
Album Phonetic Artist
Album English Artist
Album Genre
Album Genre 2
Album Label Name
Album Copyright Year
Album Copyright
Album P Copyright Year
Album P Copyright
Release Date
Sale Start Date
Original Release Year
Album Parental Advisory
Album Recording Location
Track Title
Track Phonetic Title
Track English Title
Track Title Version
Track Phonetic Title Version
Track English Title Version
Track Artist
Track Phonetic Artist
Track English Artist
Track Genre
Track Genre 2
Track Number
Total Tracks
Disc Number
Total Discs
Preview Start
BPM
Track Label Name
Track P Copyright Year
Track P Copyright
ISRC
Cleared For Sale
Part of a gapless Album
Track Parental Advisory
Track Recording Location Note that for the Genres and Parental Advisory field, which appear as pop-up menus in the media collection information window and the media content information window, the data you import must exactly match the menu choices. If you are using Excel spreadsheet program from Microsoft Corporation, save your data as a "Unicode Text UTF-16" file. Note that Excel can undesirably automatically remove all leading zeros from your UPC, EAN, and JAN numbers and also save the numbers in scientific notation.

After a media collection (e.g., playlist) has been submitted, it can be changed. Using the media submission program, the previously submitted playlist can be edited. Once edited, the playlist can again be submitted.

The various aspects, features, embodiments or implementations of the invention described above can be used alone or in various combinations.

Although the media assets (or media items) of emphasis in several of the above embodiments were audio items (e.g., songs, audio files or audio tracks), the media assets are not limited to audio items. For example, the media assets can alternatively pertain to videos (e.g., movies, television shows), podcasts, audiobooks, and/or images (e.g., photos).

The invention is preferably implemented by software, but can also beimplemented in hardware or a combination of hardware and software. The inventioncan also be embodied as computer readable code on a computer readable medium.The computer readable medium is any data storage device that can store data whichcan thereafter be read by a computer system. Examples of the computer readablemedia include read-only memory, random-access memory, CD-ROMs, DVDs, magnetictape, and optical data storage devices. The computer readablemedium can also be distributed over network-coupled computer systems so that thecomputer readable code is stored and executed in a distributed fashion.

The advantages of the invention are numerous. Different embodiments or implementations may, but need not, yield one or more of the following advantages. One advantage of the invention is that submission of media to online media hosting sites can be achieved with uniformity. The uniformity eases the burden on representatives of the online media hosting sites to process the media submissions. Another advantage of the invention is that media submissions can be processed in an automated manner.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A graphical user interface for use in submitting a media collection to a media distribution site, said graphical user interface being presented on a display device associated with a computing device, said graphical user interface comprising:

a media collection information window, presented on the display device, for assisting a user in providing media collection information, the media collection information including information that is associated with a media collection, the media collection including a plurality of media items; and a media content information window, presented on the display device, for assisting a user in providing media content information for each of the media items in the media collection, the media content information including information that is associated with one of the media items in the media collection, wherein said media collection information window includes a distribution rights component wherein the user can specify one or more countries, territories or regions where the media collection can be distributed by the media distribution site, and wherein said media collection information window further includes a distribution start data component wherein the user can specify different sales start dates for different ones of the countries, territories or regions specified in the distribution rights component.

2. A graphical user interface as recited in claim 1, wherein said graphical user interface is provided by a media submission program.

3. A graphical user interface as recited in claim 1, wherein the media collection is a playlist.

4. A graphical user interface as recited in claim 1, wherein said media collection information window includes a language component wherein the user can specify a language for use with the media collection.

5. A graphical user interface as recited in claim 1, wherein the media distribution site permits the media collection to be sold only in the one or more countries, territories or regions specified in the distribution rights component.

6. A graphical user interface as recited in claim 1, wherein said media collection information window includes a pricing component wherein the user can specify a pricing arrangement for use by the media distribution site when distributing the media collection.

7. A graphical user interface as recited in claim 6, wherein the pricing arrangement is specified by selecting one of a plurality of predetermined pricing tiers, and wherein the price associated with the predetermined pricing tiers is determined by a distribution agreement between the user and the media distribution site.

8. A graphical user interface as recited in claim 1, wherein said media collection information window comprises:

a language component wherein the user can specify a language for use with the media collection; and a pricing component wherein the user can specify a pricing arrangement for use by the media distribution site when distributing the media collection.

9. A graphical user interface as recited in claim 1, wherein said media collection information window comprises:

a language component wherein the user can specify a language for use with the media collection; and a title component wherein the user can specify a title for the media collection, wherein when the language specified via the language component is a non-English language, the title component enables the user to specify a title in the language specified as well as in an English language.

10. A graphical user interface as recited in claim 9, wherein when the language specified via the language component is a non-English language, the title component enables the user to specify a title in the language specified, in a phonetic manner, and in an English language.

11. A graphical user interface as recited in claim 1, wherein said media content information window includes a title component wherein the user can specify a title for a media item in the media collection, and wherein when a language specified for the media collection is a non-English language, the title component enables the user to specify a title in the language specified as well as in an English language.

12. A graphical user interface as recited in claim 11, wherein when the language specified for the media collection is a non-English language, the title component enables the user to specify a title in the language specified, in a phonetic manner, and in the English language.

13. A graphical user interface as recited in claim 1, wherein said media collection information window includes a pricing component wherein the user can specify a per-item price for use by the media distribution site when distributing any of the media items in the media collection.

14. A graphical user interface as recited in claim 1, wherein said media collection information window includes a gapless playback component wherein the user can specify whether one or more of the media items are gapless or can be playback in a gapless manner.

15. A computer readable medium including an electronic media package stored thereon for submitting a media collection to a media distribution site, said computer readable medium comprising:

an image file associated with the media collection, the media collection including a plurality of media items;

a metadata file including metadata for the media collection and/or one or more of the media items within the media collection, the metadata specifying at least one or more locations where the media collection can be sold, and a sales start date for each of the one or more locations where the media collection can be sold; and a plurality of media files, each of said media files pertaining to one of the media items within the media collection.

16. An electronic media package as recited in claim 15, wherein the metadata specifies at least title, artist, genre, and release year.

17. An electronic media package as recited in claim 16, wherein the metadata further specifies a pricing tier.

18. An electronic media package as recited in claim 17, wherein the locations are countries, territories or regions, and wherein the media distribution site uses the pricing tier, the locations, and the sales start dates when distributing the media collection.

19. An electronic media package as recited in claim 16, wherein the metadata further specifies a language associated with the media collection.

20. An electronic media package as recited in claim 19, wherein when the language specified for the media collection is a non-English language, the metadata includes a title in at least two of the following forms: the language specified, in a phonetic manner, and in the English language.

21. An electronic media package as recited in claim 15, wherein the metadata includes lyrics for at least one of the media items within the media collection.

22. A method performed by a computing device for submitting a media collection to a media distribution site, said method comprising:

obtaining information for the media collection, the information associated with the media collection including at least (i) distribution rights data pertaining to one or more countries, territories or regions where the media collection is authorized to be distributed by the media distribution site, and (ii) a plurality of different sales start dates for the media collection in the one or more countries, territories or regions where the media collection is authorized to be distributed by the media distribution site;

obtaining media content for a plurality of media items to be included in the media collection, the media content being obtained from one or more media sources;

converting the media content for the plurality of media items into compressed media files;

obtaining information for each of the plurality of media items;

forming an electronic package of the media collection, the electronic package including at least the compressed media files, the information associated with the media collection, and the information associated with the plurality of media items; and electronically transmitting the electronic package to the media distribution site.

23. A method as recited in claim 22, wherein the information associated with the media collection is metadata for the media collection, and wherein the information associated with the plurality of media items is metadata for each of the media items.

24. A method as recited in claim 22, wherein the information associated with the media collection includes at least a sales start date for the media collection.

25. A method as recited in claim 22, wherein the information associated with the plurality of media items includes at least a per-item price for one or more of the media items.

26. A method as recited in claim 22, wherein the information associated with the media collection includes at least two or more genre to be associated with the media collection.

27. A method as recited in claim 26, wherein the information associated with the media items includes at least two or more genre to be associated with at least one of the media items.

28. A method as recited in claim 22, wherein the information associated with the media collection includes at least a pricing component that specifies a pricing arrangement for use by the media distribution site when distributing the media collection.

29. A method as recited in claim 28, wherein the pricing arrangement is specified by selecting one of a plurality of predetermined pricing tiers, and wherein the price associated with the predetermined pricing tiers is determined by a distribution agreement between the user and the media distribution site.

30. A method as recited in claim 22, wherein the information associated with the media collection includes at least a language indication that specifies a language for use with the media collection.

31. A graphical user interface as recited in claim 30, wherein when the language specified by the language indication is a non-English language, a title for the media collection can be specified in the language specified, in a phonetic manner, and in the English language.

32. A method as recited in claim 31, wherein said obtaining of the information for each of the plurality of media items is performed, at least in part, by importing at least a portion of the information for one or more of the plurality of media items from an electronic file, and wherein said obtaining of the information for the media collection is performed, at least in part, by importing at least a portion of the information for one or more of the plurality of media items from an electronic file.

33. A method as recited in claim 22, wherein the information associated with the media collection includes at least gapless information pertaining to one or more of the plurality of media items.

34. A computer readable medium including at least computer program code tangibly stored thereon for submitting a media collection to a media distribution site, said computer readable medium including at least:

computer program code for obtaining information for the media collection, wherein the information obtained for the media collection includes at least distribution start data that permits different sales start dates to be specified for different locations where the media collection is available for distribution;

computer program code for obtaining media content for a plurality of media items to be included in the media collection, the media content being obtained from one or more media sources;

computer program code for converting the media content for the plurality of media items into compressed media files;

computer program code for obtaining information for each of the plurality of media items;

computer program code for forming an electronic package of the media collection, the electronic package including at least the compressed media files, the information associated with the media collection, and the information associated with the plurality of media items; and computer program code for electronically transmitting the electronic package to the media distribution site.

35. A computer readable medium as recited in claim 34, wherein the information associated with the media collection includes at least one of:

a language indication that specifies a language for use with the media collection;

a sales start date for the media collection;

distribution rights data pertaining to one or more countries, territories or regions where the media collection is authorized to be distributed by the media distribution site;

a plurality of different sales start dates for the media items in the media collection, and a second sales start date for another one or more of the media items in the media collection; and a pricing component that specifies a pricing arrangement for use by the media distribution site when distributing the media collection.

36. A computer readable medium as recited in claim 35, wherein the information associated with the plurality of media items includes at least per-item prices for each of the media items.

* * * * *

UNITED STATES PATENT AND TRADEMARK OFFICE

CERTIFICATE OF CORRECTION

PATENT NO. : 7,844,548 B2
APPLICATION NO. : 11/609815
DATED : November 30, 2010
INVENTOR(S) : Gregory Robbin et al.

It is certified that error appears in the above-identified patent and that said Letters Patent is hereby corrected as shown below:

On Title page 2, Item [56], in column 2, under “Other Publications”, line 28, delete “Formate” and insert -- Format --, therefor.

In column 16, line 58, delete “Playlist.lnfo” and insert -- Playlist.Info --, therefor.

In column 24, line 21, delete “beimplemented” and insert -- be implemented --, therefor.

In column 24, line 22, delete “inventioncan” and insert -- invention can --, therefor.

In column 24, line 23-24, delete “medium.The” and insert -- medium. The --, therefor.

In column 24, line 25, delete “whichcan” and insert -- which can --, therefor.

In column 24, line 26, delete “readablemedia” and insert -- readable media --, therefor.

In column 24, line 28, delete “magnetictape” and insert -- magnetic tape --, therefor.

In column 24, line 29, delete “readablemedium” and insert -- readable medium --, therefor.

In column 24, line 30, delete “thecomputer” and insert -- the computer --, therefor.

Signed and Sealed this
Twenty-fifth Day of October, 2011

David J. Kappos
*Director of the United States Patent and Trademark Office*